US012283413B2

(12) United States Patent
Hayashi

(10) Patent No.: US 12,283,413 B2
(45) Date of Patent: Apr. 22, 2025

(54) COIL STRUCTURE, LEAD FRAME, AND INDUCTOR

(71) Applicant: SHINKO ELECTRIC INDUSTRIES CO., LTD., Nagano (JP)

(72) Inventor: Shintaro Hayashi, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 947 days.

(21) Appl. No.: 17/241,459

(22) Filed: Apr. 27, 2021

(65) Prior Publication Data

US 2021/0350979 A1 Nov. 11, 2021

(30) Foreign Application Priority Data

May 8, 2020 (JP) ................................ 2020-082671

(51) Int. Cl.
*H01F 27/28* (2006.01)
*H01F 27/24* (2006.01)
(Continued)

(52) U.S. Cl.
CPC ............ *H01F 27/29* (2013.01); *H01F 27/24* (2013.01); *H01F 27/327* (2013.01); *H01F 41/04* (2013.01)

(58) Field of Classification Search
CPC ........ H01F 27/29; H01F 27/24; H01F 27/327; H01F 41/04; H01F 17/045; H01F 27/292;
(Continued)

(56) References Cited

U.S. PATENT DOCUMENTS

2010/0033288 A1* 2/2010 Yokoyama .......... H01F 41/0246 336/200
2010/0277267 A1 11/2010 Bogert et al.
(Continued)

FOREIGN PATENT DOCUMENTS

| | | |
|---|---|---|
| CN | 102428528 | 4/2012 |
| JP | 2019-117829 | 7/2019 |

(Continued)

OTHER PUBLICATIONS

Office Action mailed on Sep. 5, 2023 with respect to the corresponding Japanese patent application No. 2020-082671.
(Continued)

*Primary Examiner* — Shawki S Ismail
*Assistant Examiner* — Kazi S Hossain
(74) *Attorney, Agent, or Firm* — IPUSA, PLLC

(57) ABSTRACT

A coil structure includes layered metal plates, wherein each of the metal plates includes a lead wire portion having a partial-loop shape, end portion thick plate portions formed at both ends of the lead wire portion and thicker than the lead wire portion, and an inside thick plate portion formed with a thickness the same as the end portion thick plate portions, the inside thick plate portion being arranged inside a partial loop formed by the lead wire portion and being away from the lead wire portion, and wherein adjacent metal plates are bonded to each other at one of the end portion thick plate portions, the lead wire portions of the respective metal plates are connected in series to form a coil having a partial-loop shape, and the inside thick plate portions of the adjacent metal plates are bonded to each other to form a magnetic core.

9 Claims, 28 Drawing Sheets

(51) Int. Cl.

| | |
|---|---|
| ***H01F 27/29*** | (2006.01) |
| ***H01F 27/32*** | (2006.01) |
| ***H01F 41/04*** | (2006.01) |

(58) Field of Classification Search
CPC ... H01F 17/0013; H01F 27/28; H01F 27/2847
USPC .......................................... 336/192, 198, 200
See application file for complete search history.

(56) References Cited

U.S. PATENT DOCUMENTS

| | | | | |
|---|---|---|---|---|
| 2019/0198219 | A1* | 6/2019 | Shirai | H01F 27/24 |
| 2020/0051728 | A1 | 2/2020 | Matsumoto et al. | |
| 2020/0128675 | A1* | 4/2020 | Matsumoto | H05K 3/4658 |

FOREIGN PATENT DOCUMENTS

| | | |
|---|---|---|
| JP | 2020-027820 | 2/2020 |
| JP | 2020-065007 | 4/2020 |

OTHER PUBLICATIONS

Office Action dated Mar. 4, 2025 issued with related Chinese Application No. 202110480300.4.

* cited by examiner

COIL STRUCTURE, LEAD FRAME, AND INDUCTOR

CROSS-REFERENCE TO RELATED APPLICATION

This application is based upon and claims priority to Japanese Patent Application No. 2020-082671, filed on May 8, 2020, the entire contents of which are incorporated herein by reference.

FIELD

The present disclosure relates to a coil structure, a lead frame, and an inductor.

BACKGROUND

In electric circuits, inductors may be used for purposes of stabilizing currents, converting voltages, or the like. In recent years, the size reduction of electronic devices, such as game consoles, smartphones, or the like, has accelerated. Consequently, there are demands to also reduce the size of the inductors provided in such electronic devices, and surface-mount type inductors have been proposed.

An example of such an inductor provided in the electronic device may have a structure in which a coil structure is encapsulated by a resin. The coil structure may include windings made of a thin metal plate, for example.

RELATED-ART DOCUMENTS

Patent Documents

[Patent Document 1] Japanese Laid-open Patent Publication No. 2020-027820

However, in a coil structure having windings made of a thin metal plate, it is difficult to obtain a large induced electromotive force.

In view of the above, the present disclosure has an object to provide a coil structure that enables to obtain a large induced electromotive force.

SUMMARY

A coil structure includes a plurality of layered metal plates, wherein each of the metal plates includes a lead wire portion having a partial-loop shape, end portion thick plate portions that are formed at both ends of the lead wire portion and that are thicker than the lead wire portion, and an inside thick plate portion that is formed with a thickness the same as the end portion thick plate portions, the inside thick plate portion being arranged inside a partial loop formed by the lead wire portion and being away from the lead wire portion, and wherein each of the metal plates is layered such that adjacent metal plates are bonded to each other at one of the end portion thick plate portions, the lead wire portions of the respective metal plates are connected in series to form a coil having a partial-loop shape, and the inside thick plate portions of the adjacent metal plates are bonded to each other to form a magnetic core.

According to the present disclosure, it is possible to provide a coil structure that enables to obtain a large induced electromotive force.

The object and advantages of the invention will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1A:
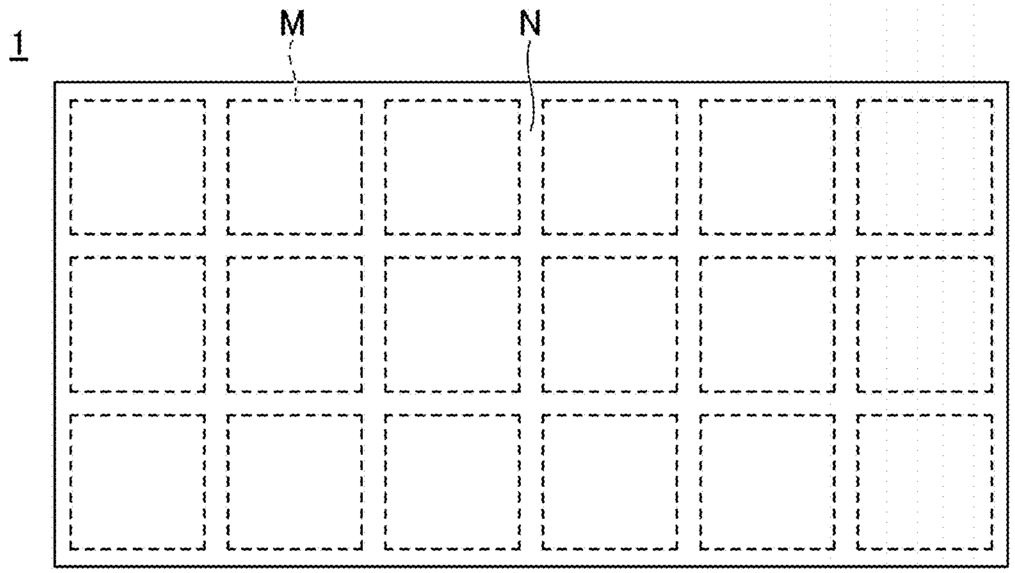
FIGS. 1A and 1B are plan views illustrating an example of a coil structure according to a first embodiment.

In the following, embodiments will be described with reference to the accompanying drawings. It should be noted that in the drawings, same constituent elements may be referred to by the same reference numerals, and duplicate descriptions may be omitted as appropriate.

First Embodiment

Figure 1B:
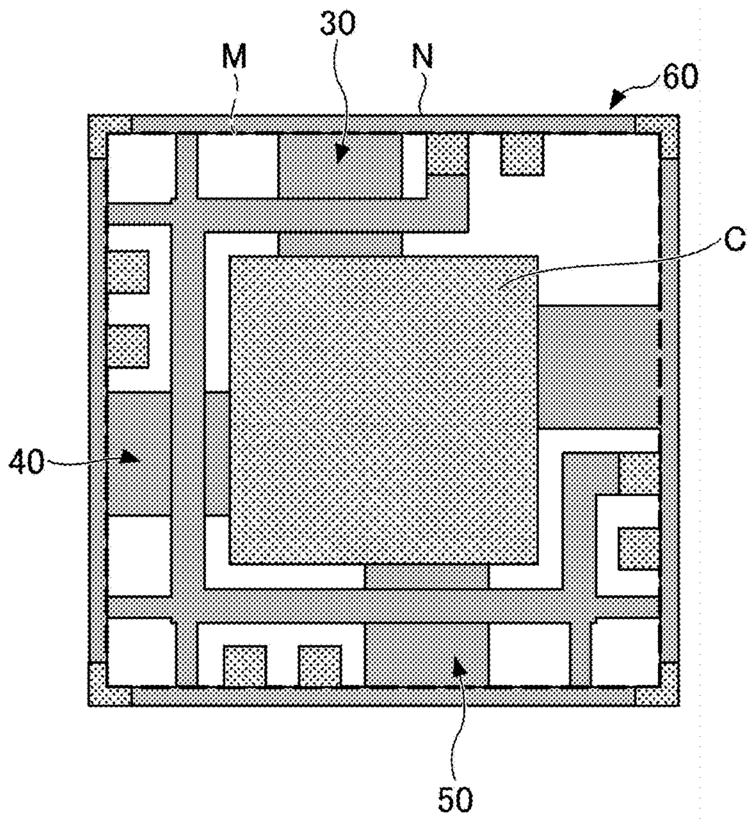
Figure 2A:
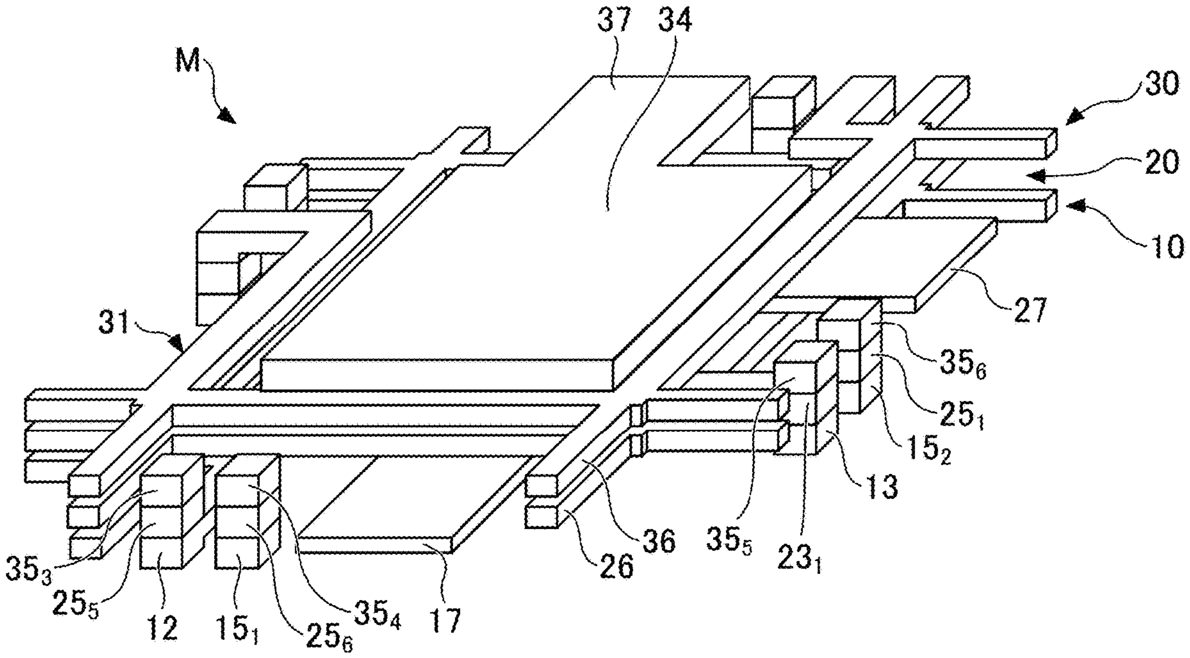
FIGS. 2A and 2B are perspective view of one product area illustrated in FIG. 1A.
Figure 2B:
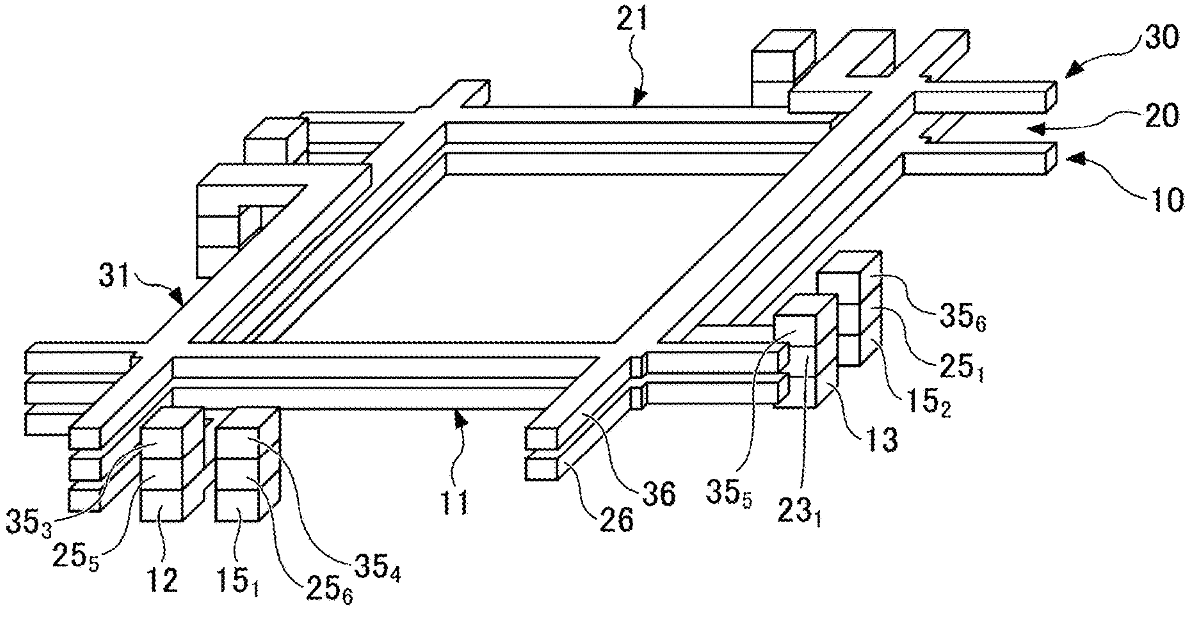

FIG. 1A and FIG. 1B are plan views illustrating an example of a coil structure 1 according to a first embodiment. FIG. 1A illustrates an overall view, and FIG. 1B illustrates an enlarged view of a vicinity of one product area M in FIG. 1A. FIGS. 2A and 2B are perspective views of one product area M illustrated in FIG. 1A. FIG. 2A illustrates a state where a magnetic core is present and FIG. 2B illustrates a state where the magnetic core is removed for convenience of description. Although the coil structure 1 has a six-layer structure in which the first metal plate to the sixth metal plate are sequentially layered, in FIG. 2A and FIG. 2B, three layers from the first metal plate to the third metal plate are illustrated for convenience of description.

As illustrated in FIG. 1A, FIG. 1B, and FIGS. 2A and 2B, the coil structure 1 has a structure in which two or more metal plates are layered, and vertically adjacent metal plates are bonded to each other. The plurality of metal plates may be at least two metal layers, and in this case, the coil structure 1 has a two-layer structure. In the present embodiment, an example of the coil structure 1 is described as having a six-layer structure in which a first metal plate 10, a second metal plate 20, a third metal plate 30, a fourth metal plate 40, a fifth metal plate 50, and a sixth metal plate 60 are successively layered.

The coil structure 1 has a plurality of product areas M arranged vertically and horizontally in a checkerboard pattern in a plan view. Each of the product areas M becomes an inductor after the entire coil structure 1 is encapsulated by a resin and separated. A frame portion N having a picture-frame shape, which supports each of the product areas M from the peripheral side, is formed around each of the product areas M. Adjacent frame portions N are integrally formed and coupled to each other. A magnetic core C is arranged at the approximately central portion of each of the product areas M. For example, the plane shape of the magnetic core C may be a rectangular shape, such as a square shape or an oblong shape. It should be noted that although FIG. 1A illustrates an example in which 18 (3 rows by 6 columns) product areas M are arranged, the number and the arrangement of product areas M are not particularly limited to this.

Figure 3A:
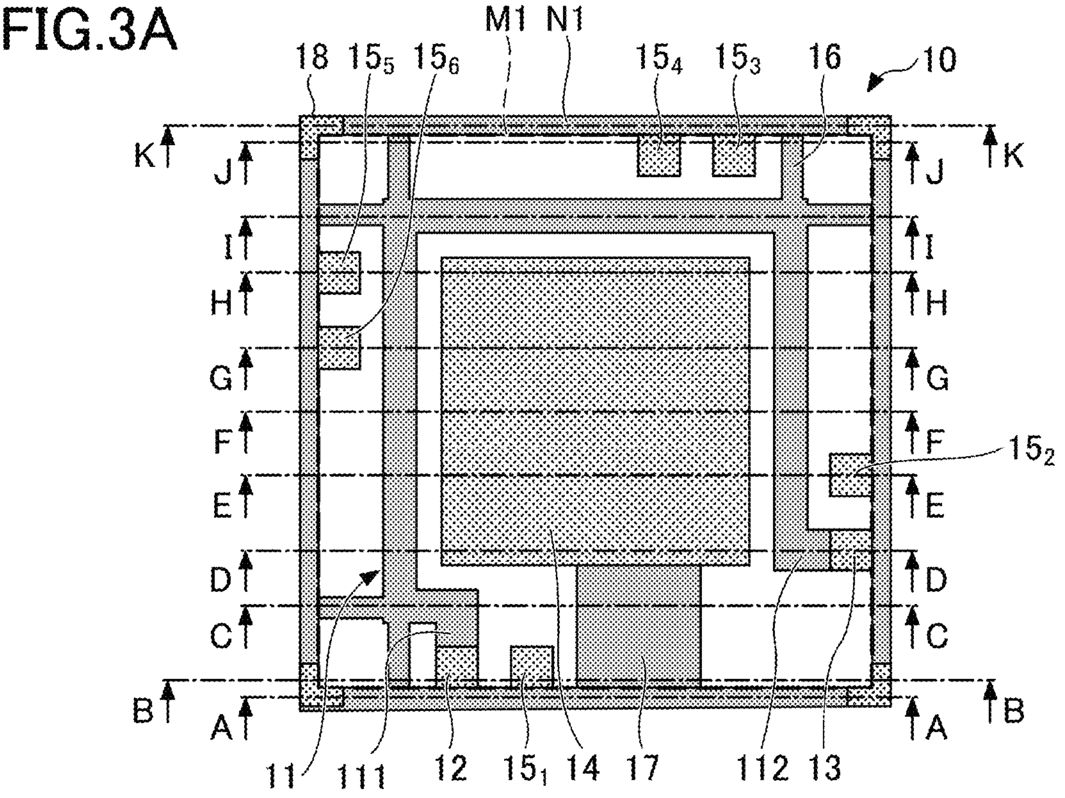
FIGS. 3A and 3B are plan views (part 1) illustrating an example of a vicinity of the product area of each metal plate before being layered.
Figure 3B:
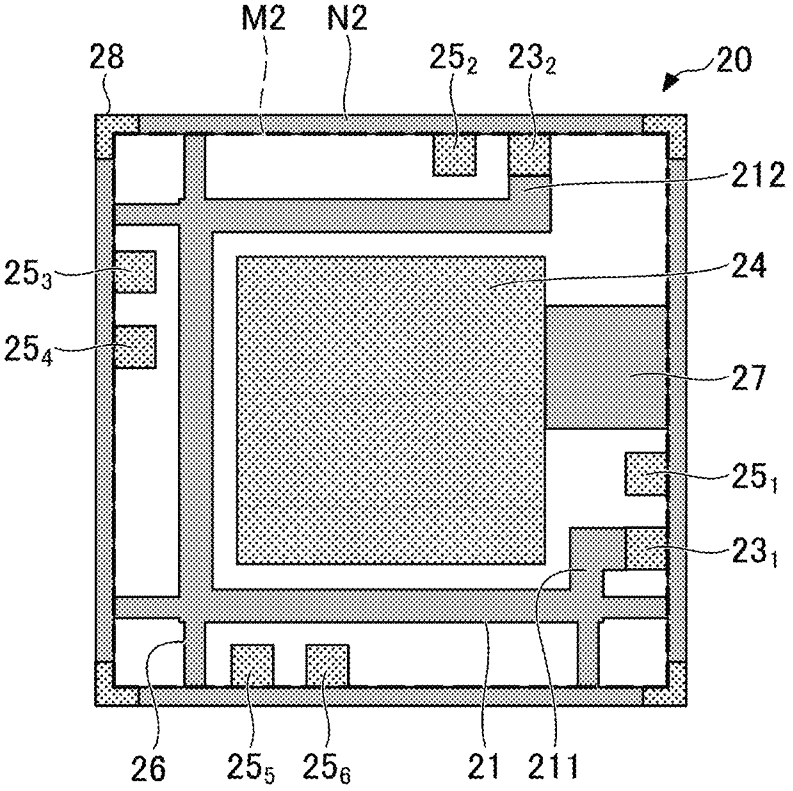
Figure 4A:
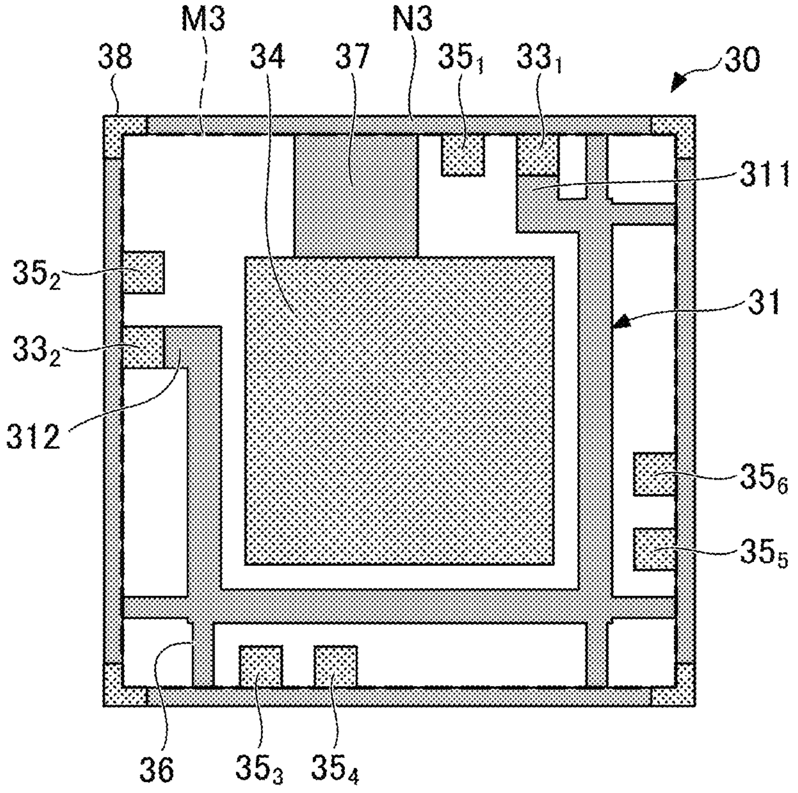
FIGS. 4A and 4B are plans views (part 2) illustrating the example of the vicinity of the product area of each metal plate before being layered.
Figure 4B:
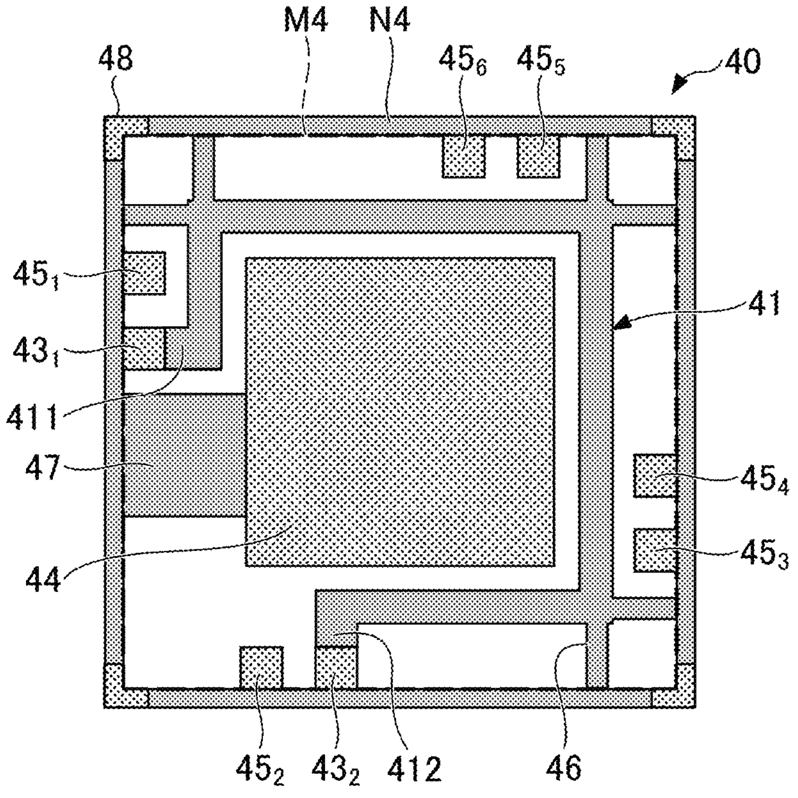
Figure 5A:
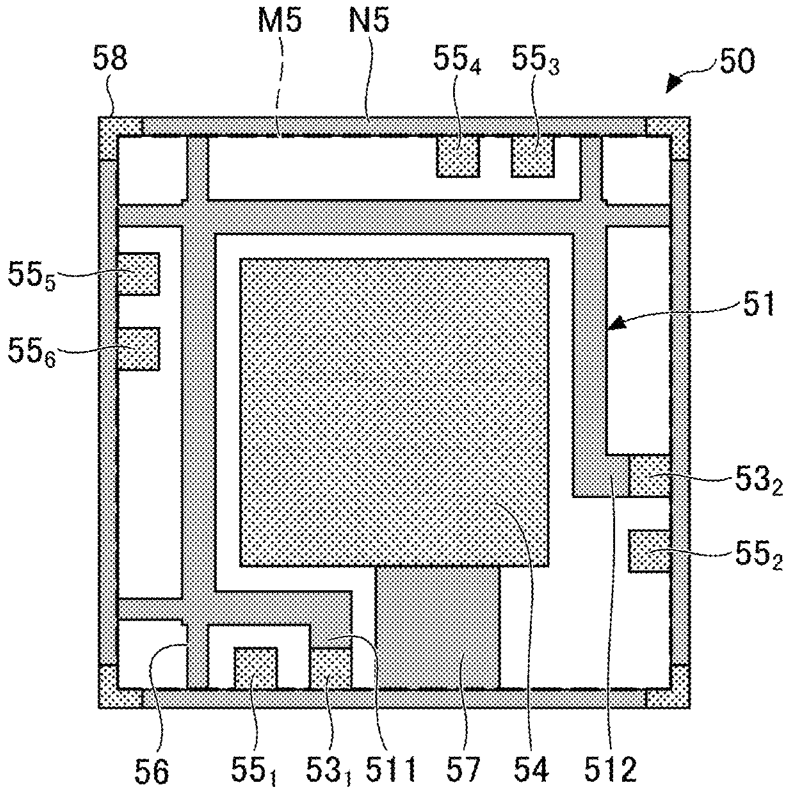
FIGS. 5A and 5B are plan views (part 3) illustrating the example of the vicinity of the product area of each metal plate before being layered.
Figure 5B:
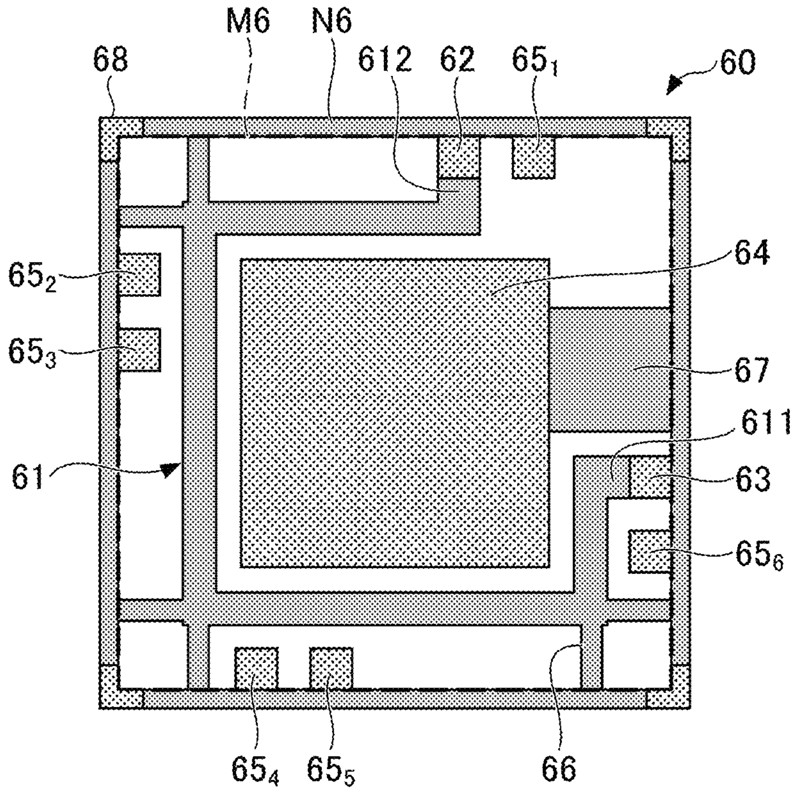

FIG. 3A to FIG. 5B are plan views illustrating an example of the vicinity of the product area of each metal plate before being layered. Specifically, FIG. 3A is a plan view of the first metal plate 10, and FIG. 3B is a plan view of the second metal plate 20. FIG. 4A is a plan view of the third metal plate 30, and FIG. 4B is a plan view of the fourth metal plate 40. FIG. 5A is a plan view of the fifth metal plate 50, and FIG. 5B is a plan view of the sixth metal plate 60.

Each of the first metal plate 10, the second metal plate 20, the third metal plate 30, the fourth metal plate 40, the fifth metal plate 50, and the sixth metal plate 60 has a planar shape similar to that of FIG. 1A. FIG. 3A to FIG. 5B illustrate an example of a portion (near one product area) of each metal plate corresponding to FIG. 1B. In FIG. 3A through FIG. 5B, a portion indicated in grey illustrates a thin plate portion, and a portion indicated by a halftone dot pattern illustrates a thick plate portion that is formed to be thicker than the thin plate portion and protrude downward relative to the thin plate portion. The thin plate portion and the thick plate portion are integrally formed.

The product areas M illustrated in FIG. 3A to FIG. 5B include a product area M1 of the first metal plate 10, a product area M2 of the second metal plate 20, a product area M3 of the third metal plate 30, a product area M4 of the fourth metal plate 40, a product area M5 of the fifth metal plate 50, and a product area M6 of the sixth metal plate 60. Further, the frame portions N illustrated in FIG. 3A to FIG. 5B include a frame portion N1 of the first metal plate 10, a frame portion N2 of the second metal plate 20, a frame portion N3 of the third metal plate 30, a frame portion N4 of the fourth metal plate 40, a frame portion N5 of the fifth metal plate 50, and a frame portion N6 of the sixth metal plate 60.

Figure 6A:
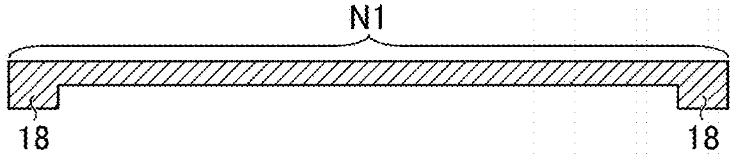
FIGS. 6A to 6K are cross sectional views of a first metal plate taken along lines A-A through G-G in FIG. 3A, respectively.
Figure 6B:
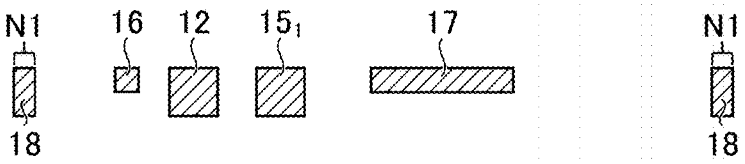
Figure 6C:
Figure 6D:
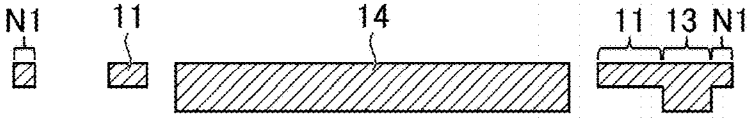
Figure 6E:
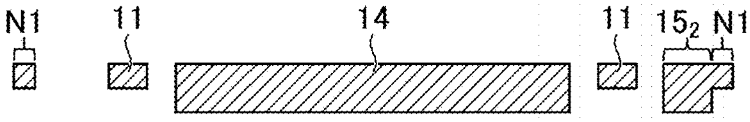
Figure 6F:
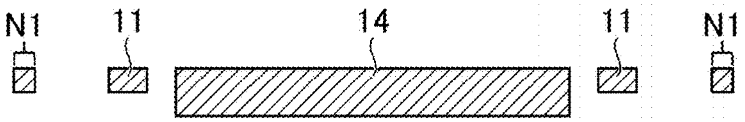
Figure 6G:
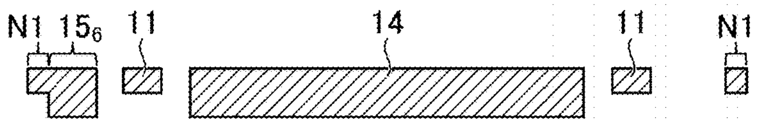
Figure 6H:
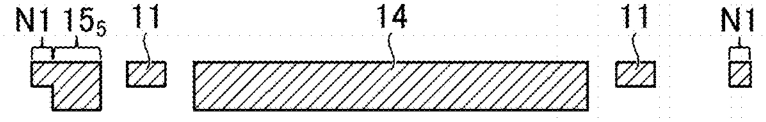
Figure 6I:
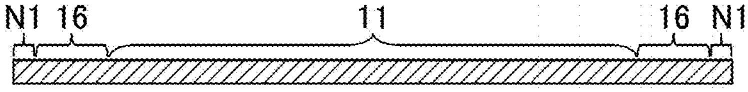
Figure 6J:
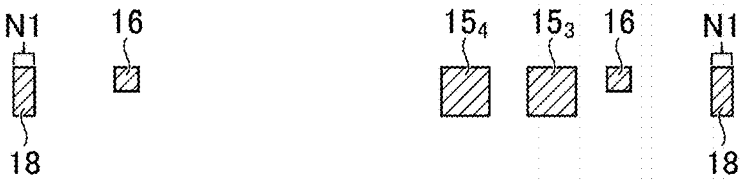
Figure 6K:
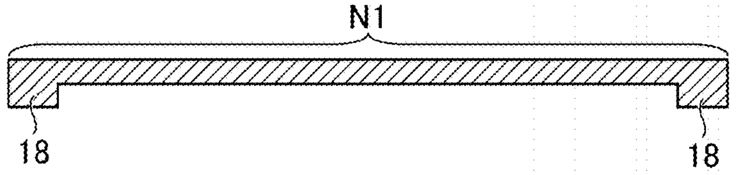

FIG. 6A through FIG. 6K are cross sectional views of the first metal plate 10 taken along lines A-A through K-K in FIG. 3A, respectively. Specifically, FIG. 6A is the cross sectional view of the first metal plate 10 taken along the line A-A in FIG. 3A. FIG. 6B is the cross sectional view of the first metal plate 10 taken along the line B-B in FIG. 3A. FIG. 6C is the cross sectional view of the first metal plate 10 taken along the line C-C in FIG. 3A. FIG. 6D is the cross sectional view of the first metal plate 10 taken along the line D-D in FIG. 3A. FIG. 6E is the cross sectional view of the first metal plate 10 taken along the line E-E line in FIG. 3A. FIG. 6F is the cross sectional view of the first metal plate 10 taken along the line F-F in FIG. 3A. FIG. 6G is the cross sectional view of the first metal plate 10 taken along the line G-G in FIG. 3A. FIG. 6H is the cross sectional view of the first metal plate 10 taken along the line H-H in FIG. 3A. FIG. 6I is the cross sectional view of the first metal plate 10 taken along the line I-I in FIG. 3A. FIG. 6J is the cross sectional view of the first metal plate 10 taken along the line J-J in FIG. 3A. FIG. 6K is the cross sectional view of the first metal plate 10 taken along the line K-K in FIG. 3A.

As illustrated in FIG. 3A and FIGS. 6A to 6K, the product area M1 of the first metal plate 10 includes a lead wire portion 11, a terminal portion 12, a coupling portion 13, a magnetic core portion 14, and support portions $\mathbf{15}_1$ to $\mathbf{15}_6$.

The lead wire portion 11 is formed, inside the product area M1, in a partial-loop shape (approximately ¾ turns) that is substantially rectangular, and is connected to a frame portion N1 by a plurality of connection portions 16 (in this case, six connection portions as an example) extending from the inside of the product area M1 to the outside of the product area M1. Although the number and connection positions of the connection portions 16 may be determined as desired if the lead wire portion 11 can be stably supported with the frame portion N1, it is preferable that the connection portions are arranged near the corner portions of the lead wire portion 11 that has a substantially rectangular shape.

The terminal portion 12 is formed on a start point 111, which is one end of the lead wire portion 11, and the coupling portion 13 is formed on an end point 112, which is the other end of the lead wire portion 11. The planar shapes of the terminal portion 12 and coupling portion 13 may be, for example, square shapes or oblong shapes. The lead wire portion 11, the connection portions 16, and the frame portion N1 are thin plate portions formed with a predetermined thickness, and the terminal portion 12 and the coupling portion 13 are thick plate portions formed with a same thickness thicker than the lead wire portion 11 and the like. The terminal portion 12 and the coupling portion 13 may be collectively referred to as end portion thick plate portions.

The terminal portion 12 is arranged inside the product area M1. The side of the terminal portion 12 opposite the connection portion with the start point 111 of the lead wire portion 11 extends to the outside of the product area M1 to be connected to the frame portion N1. The portion extending from the terminal portion 12 is a thin plate portion similar to the connection portions 16. The coupling portion 13 is arranged inside the product area M1. The side of the coupling portion 13 opposite the connection portion with the end point 112 of the lead wire portion 11 extends to the outside of the product area M1 to be connected to the frame portion N1. The portion extending from the coupling portion 13 is a thin plate portion similar to the connection portions 16. The side of the frame portion N1 to which the coupling portion 13 is connected is adjacent to and is substantially perpendicular to the side of the frame portion N1 to which the terminal portion 12 is connected.

The magnetic core portion 14 is arranged inside the partial loop formed by the lead wire portion 11 and is away from the lead wire portion 11. The magnetic core portion 14 is connected, by the magnetic core connection portion 17 extending from the inside of the product area M1 to the outside of the product area M1, to the side that is the same as the side of the frame portion N1 to which the terminal portion 12 and the support portion $\mathbf{15}_1$ are connected. That is, the magnetic core portion 14 is supported with the frame portion N1 through the magnetic core connection portion 17 provided in an area where the lead wire portion 11 of the first metal plate 10 is not arranged. The magnetic core portion 14 is a thick plate portion formed with the same thickness as the terminal portion 12 and the coupling portion 13 and is formed in a substantially square shape at a substantially central portion of the product area M1. The magnetic core connection portion 17 is a thin plate portion formed with the same thickness as the lead wire portion 11 and the like. The magnetic core portion 14 is electrically independent of the lead wire portion 11. The magnetic core portion 14 may be referred to as an inside thick plate portion.

The support portions $\mathbf{15}_1$ to $\mathbf{15}_6$ are arranged inside the product area M1 and outside the partial loop formed by the lead wire portion 11. For each of the support portions $\mathbf{15}_1$ to $\mathbf{15}_6$, one side extends to the outside of the product area M1 to be connected to the frame portion N1. The support portions $\mathbf{15}_1$ to $\mathbf{15}_6$ are thick plate portions formed with the same thickness as the terminal portion 12 and the coupling portion 13. The portion extending from each of the support portions $\mathbf{15}_1$ to $\mathbf{15}_6$ is a thin plate portion similar to the connection portions 16. The other side of each of the support portions $\mathbf{15}_1$ to $\mathbf{15}_6$ is not connected to the lead wire portion 11. That is, the support portions $\mathbf{15}_1$ to $\mathbf{15}_6$ and the lead wire portion 11 are electrically independent, and the support portions $\mathbf{15}_1$ to $\mathbf{15}_6$ and the lead wire portion 11 are not electrically connected. The support portions $\mathbf{15}_1$ to $\mathbf{15}_6$ are portions that support thick plate portions of other metal plates.

The support portion $\mathbf{15}_1$ is connected to the same side as the side of the frame portion N1 to which the terminal portion 12 is connected, and is adjacent to the terminal portion 12 with a predetermined interval. The support portion $\mathbf{15}_2$ is connected to the same side as the side of the frame portion N1 to which the coupling portion 13 is connected, and is adjacent to the coupling portion 13 with a predetermined interval. The support portions $\mathbf{15}_3$ and $\mathbf{15}_4$ are connected to the side opposite to the side of the frame portion N1 to which the terminal portion 12 is connected and are adjacent to each other with a predetermined interval. The support portions $\mathbf{15}_5$ and $\mathbf{15}_6$ are connected to the side opposite to the side of the frame portion N1 to which the coupling portion 13 is connected and are adjacent to each other with a predetermined interval.

The upper surfaces of the lead wire portion 11, the connection portions 16, the magnetic core connection portion 17, and the frame portion N1 (the surfaces toward the second metal plate 20) and the upper surfaces of the terminal portion 12, the coupling portion 13, the magnetic core portion 14, and the support portions $\mathbf{15}_1$ to $\mathbf{15}_6$ (the surfaces toward the second metal plate 20) are substantially on a same plane. On the other hand, the lower surfaces of the lead wire portion 11, the connection portions 16, the magnetic core connection portion 17, and the frame portion N1 are located at positions recessed toward the second metal plate 20 with respect to the lower surfaces of the terminal portion 12, the coupling portion 13, the magnetic core portion 14, and the support portions $\mathbf{15}_1$ to $\mathbf{15}_6$. Here, when an inductor is manufactured from the coil structure 1 and mounted on a substrate, the surface facing the substrate is referred to as a lower surface and the surface that is the opposite side of the lower surface is referred to as the upper surface (the same shall apply hereinafter).

It should be noted that the frame portion N1 may have a first portion having the same thickness as the lead wire portion 11 and the like and a second portion having the same thickness as the terminal portion 12 and the like. For example, as the second portion, in order to reinforce the frame portion N1 and prevent the metal plate from being inclined, reinforcement portions 18 may be provided at the four corner portions of the frame portion N1. In this case, the lower surfaces of the reinforcement portions 18 are on a plane that is substantially the same as the lower surface of the terminal portion 12 and the like. The reinforcement portions 18 can be formed, for example, in an L-shape. In order to reinforce the frame portion N1 and prevent the metal plate from being inclined, in place of the reinforcement portions 18 or in addition to the reinforcement portions 18, a second portion (a thick plate portion) may be provided at a portion other than the corner portions of the frame portion N1.

The thicknesses of the terminal portion 12, the coupling portion 13, the magnetic core portion 14, and the support portions $\mathbf{15}_1$ to $\mathbf{15}_6$ may be, for example, about 50 μm to 500 μm. The thicknesses of the lead wire portion 11, the connection portions 16, the magnetic core connection portion 17, and the frame portion N1 may be, for example, about half that of the terminal portion 12 and the like. It should be noted that in a case in which a reinforcement portion 18 is provided on the frame portion N1, the thickness of the reinforcement portion 18 is the same as that of the terminal portion 12 and the like.

As illustrated in FIG. 3B, the product area M2 of the second metal plate 20 includes a lead wire portion 21, a coupling portion $\mathbf{23}_1$, a coupling portion $\mathbf{23}_2$, a magnetic core portion 24, and support portions $\mathbf{25}_1$ to $\mathbf{25}_6$.

The lead wire portion 21 is formed, inside the product area M2, in a partial-loop shape (approximately ¾ turns) that is substantially rectangular, and is connected to a frame portion N2 by a plurality of connection portions 26 (in this case, six connection portions as an example) extending from the inside of the product area M2 to the outside of the product area M2. Although the number of and connection positions of the connection portions 26 may be determined as desired if the lead wire portion 21 can be stably supported with the frame portion N2, it is preferable that the connection portions are arranged near the corner portions of the lead wire portion 21 that has a substantially rectangular shape.

The coupling portion $\mathbf{23}_1$ is formed on a start point 211, which is one end of the lead wire portion 21, and the coupling portion $\mathbf{23}_2$ is formed on an end point 212, which is the other end of the lead wire portion 21. The planar shapes of the coupling portions $\mathbf{23}_1$ and $\mathbf{23}_2$ may be, for example, square shapes or oblong shapes. The lead wire portion 21, the connection portions 26, and the frame portion N2 are thin plate portions formed with a predetermined thickness, and the coupling portions $\mathbf{23}_1$ and $\mathbf{23}_2$ are thick plate portions formed with a same thickness thicker than the lead wire portion 21 and the like. The coupling portion $\mathbf{23}_1$ and the coupling portion $\mathbf{23}_2$ may be collectively referred to as end portion thick plate portions.

The coupling portion $\mathbf{23}_1$ is arranged inside the product area M2. The side of the coupling portion $\mathbf{23}_1$ opposite the connection portion with the start point 211 of the lead wire portion 21 extends to the outside of the product area M2 to be connected to the frame portion N2. The portion extending from the coupling portion $\mathbf{23}_1$ is a thin plate portion similar to the connection portions 26. The coupling portion $\mathbf{23}_2$ is arranged inside the product area M2. The side of the coupling portion $\mathbf{23}_2$ opposite the connection portion with the end point 212 of the lead wire portion 21 extends to the outside of the product area M2 to be connected to the frame portion N2. The portion extending from the coupling portion $\mathbf{23}_2$ is a thin plate portion similar to the connection portions 26. The side of the frame portion N2 to which the coupling portion $\mathbf{23}_1$ is connected is adjacent to and is substantially perpendicular to the side of the frame portion N2 to which the coupling portion $\mathbf{23}_2$ is connected The magnetic core portion 24 is arranged inside the partial loop formed by the lead wire portion 21 and is away from the lead wire portion 21. The magnetic core portion 24 is connected, by the magnetic core connection portion 27 extending from the inside of the product area M2 to the outside of the product area M2, to the side that is the same as the side of the frame portion N2 to which the coupling portion $\mathbf{23}_1$ and the support portion $\mathbf{25}_1$ are connected. That is, the magnetic core portion 24 is supported with the frame portion N2 through the magnetic core connection portion 27 provided in an area where the lead wire portion 21 of the second metal plate 20 is not arranged. The magnetic core portion 24 is a thick plate portion formed with the same thickness as the coupling portions $\mathbf{23}_1$ and $\mathbf{23}_2$ and is formed in a substantially square shape at a substantially central portion of the product area M2. The magnetic core connection portion 27 is a thin plate portion formed with the same thickness as the lead wire portion 21 and the like. The magnetic core portion 24 is electrically independent of the lead wire portion 21. The magnetic core portion 24 may be referred to as an inside thick plate portion.

The support portions $\mathbf{25}_1$ to $\mathbf{25}_6$ are arranged inside the product area M2 and outside the partial loop formed by the lead wire portion 21. For each of the support portions $\mathbf{25}_1$ to $\mathbf{25}_6$, one side extends to the outside of the product area M2 to be connected to the frame portion N2. The support portions $\mathbf{25}_1$ to $\mathbf{25}_6$ are thick plate portions formed with the same thickness as the coupling portion $\mathbf{23}_1$ and the like. The portion extending from each of the support portions $\mathbf{25}_1$ to $\mathbf{25}_6$ is a thin plate portion similar to the connection portions 26. The other side of each of the support portions $\mathbf{25}_1$ to $\mathbf{25}_6$ is not connected to the lead wire portion 21. That is, the support portions $\mathbf{25}_1$ to $\mathbf{25}_6$ and the lead wire portion 21 are electrically independent, and the support portions $\mathbf{25}_1$ to $\mathbf{25}_6$ and the lead wire portion 21 are not electrically connected. The support portions $\mathbf{25}_1$ to $\mathbf{25}_6$ are portions that support thick plate portions of other metal plates.

The support portion $\mathbf{25}_1$ is connected to the same side as the side of the frame portion N2 to which the coupling portion $\mathbf{23}_1$ is connected, and is adjacent to the coupling portion $\mathbf{23}_1$ with a predetermined interval. The support portion $\mathbf{25}_2$ is connected to the same side as the side of the frame portion N2 to which the coupling portion $\mathbf{23}_2$ is connected, and is adjacent to the coupling portion $\mathbf{23}_2$ with a predetermined interval. The support portions $\mathbf{25}_3$ and $\mathbf{25}_4$ are connected to the side opposite to the side of the frame portion N2 to which the coupling portion $\mathbf{23}_1$ is connected and are adjacent to each other with a predetermined interval. The support portions $\mathbf{25}_5$ and $\mathbf{25}_6$ are connected to the side opposite to the side of the frame portion N2 to which the coupling portion $\mathbf{23}_2$ is connected and are adjacent to each other with a predetermined interval.

The upper surfaces of the lead wire portion 21, the connection portions 26, the magnetic core connection portion 27, and the frame portion N2 (the surfaces toward the third metal plate 30) and the upper surfaces of the coupling portion $\mathbf{23}_1$, the coupling portion $\mathbf{23}_2$, the magnetic core portion 24, and the support portion $\mathbf{25}_1$ to $\mathbf{25}_6$ (the surfaces toward the third metal plate 30) are on a substantially same plane. On the other hand, the lower surfaces of the lead wire portion 21, the connection portions 26, the magnetic core connection portion 27, and the frame portion N2 are at positions recessed toward the third metal plate 30 relative to the lower surfaces of the coupling portion $\mathbf{23}_1$, the coupling portion $\mathbf{23}_2$, the magnetic core portion 24, and the support portions $\mathbf{25}_1$ to $\mathbf{25}_6$.

It should be noted that the frame portion N2 may have a first portion having the same thickness as the lead wire portion 21 and the like and a second portion having the same thickness as the coupling portions $\mathbf{23}_1$ and $\mathbf{23}_2$ and the like. For example, as the second portion, in order to strengthen bonding with an adjacent metal plate and prevent the metal plates from being inclined, reinforcement portions 28 may be provided at the four corner portions of the frame portion N2. In this case, the lower surfaces of the reinforcement portions 28 are on a plane that is substantially the same as the lower surfaces of the coupling portions $\mathbf{23}_1$ and $\mathbf{23}_2$. The reinforcement portions 28 can be formed, for example, in an L shape. In order to strengthen the bonding with an adjacent metal plate and prevent the metal plates from being inclined, in place of the reinforcement portions 28 or in addition to the reinforcement portions 28, a second portion (a thick plate portion) may be provided at a portion other than the corner portions of the frame portion N2.

The thicknesses of the coupling portion $\mathbf{23}_1$, the coupling portion $\mathbf{23}_2$, the magnetic core portion 24, and the support portion $\mathbf{25}_1$ to $\mathbf{25}_6$ may be the same as, for example, the terminal portion 12 and the like of the first metal plate 10, and the thicknesses of the lead wire portion 21, the connection portions 26, the magnetic core connection portion 27, and the frame portion N2 may be the same as, for example, the lead wire portion 11 and the like of the first metal plate 10. It should be noted that in a case in which a reinforcement portion 28 is provided on the frame portion N2, the thickness of the reinforcement portion 28 is the same as that of the coupling portion $\mathbf{23}_1$ and the like.

As illustrated in FIG. 4A, the product area M3 of the third metal plate 30 includes a lead wire portion 31, a coupling portion $\mathbf{33}_1$, a coupling portion $\mathbf{33}_2$, a magnetic core portion 34, and support portions $\mathbf{35}_1$ to $\mathbf{35}_6$.

The lead wire portion 31 is formed, inside the product area M3, in a partial-loop shape (approximately ¾ turns) that is substantially rectangular, and is connected to a frame portion N3 by a plurality of connection portions 36 (in this case, six connection portions as an example) extending from the inside of the product area M3 to the outside of the product area M3. Although the number of and connection positions of the connection portions 36 may be determined as desired if the lead wire portion 31 can be stably supported with the frame portion N3, it is preferable that the connection portions are arranged near the corner portions of the lead wire portion 31 that has a substantially rectangular shape.

The coupling portion $\mathbf{33}_1$ is formed on a start point 311, which is one end of the lead wire portion 31, and the coupling portion $\mathbf{33}_2$ is formed on an end point 312, which is the other end of the lead wire portion 31. The planar shapes of the coupling portions $\mathbf{33}_1$ and $\mathbf{33}_2$ may be, for example, square shapes or oblong shapes. The lead wire portion 31, the connection portions 36, and the frame portion N3 are thin plate portions formed with a predetermined thickness, and the coupling portions $\mathbf{33}_1$ and $\mathbf{33}_2$ are thick plate portions formed with a same thickness thicker than the lead wire portion 31 and the like. The coupling portion $\mathbf{33}_1$ and the coupling portion $\mathbf{33}_2$ may be collectively referred to as end portion thick plate portions.

The coupling portion $\mathbf{33}_1$ is arranged inside the product area M3. The side of the coupling portion $\mathbf{33}_1$ opposite the connection portion with the start point 311 of the lead wire portion 31 extends to the outside of the product area M3 to be connected to the frame portion N3. The portion extending from the coupling portion $\mathbf{33}_1$ is a thin plate portion similar to the connection portions 36. The coupling portion $\mathbf{33}_2$ is arranged inside the product area M3. The side of the coupling portion $\mathbf{33}_2$ opposite the connection portion with the end point 312 of the lead wire portion 31 extends to the outside of the product area M3 to be connected to the frame portion N3. The portion extending from the coupling portion $\mathbf{33}_2$ is a thin plate portion similar to the connection portions 36. The side of the frame portion N3 to which the coupling portion $\mathbf{33}_1$ is connected is adjacent to and is substantially perpendicular to the side of the frame portion N3 to which the coupling portion $\mathbf{33}_2$ is connected.

The magnetic core portion 34 is arranged inside the partial loop formed by the lead wire portion 31 and is away from the lead wire portion 31. The magnetic core portion 34 is connected, by the magnetic core connection portion 37 extending from the inside of the product area M3 to the outside of the product area M3, to the side that is the same as the side of the frame portion N3 to which the coupling portion $\mathbf{33}_1$ and the support portion $\mathbf{35}_1$ are connected. That is, the magnetic core portion 34 is supported with the frame portion N3 through the magnetic core connection portion 37 provided in an area where the lead wire portion 31 of the third metal plate 30 is not arranged. The magnetic core portion 34 is a thick plate portion formed with the same thickness as the coupling portions $\mathbf{33}_1$ and $\mathbf{33}_2$ and is formed in a substantially square shape at a substantially central portion of the product area M3. The magnetic core connection portion 37 is a thin plate portion formed with the same thickness as the lead wire portion 31 and the like. The magnetic core portion 34 is electrically independent of the lead wire portion 31. The magnetic core portion 34 may be referred to as an inside thick plate portion.

The support portions $\mathbf{35}_1$ to $\mathbf{35}_6$ are arranged inside the product area M3 and outside the partial loop formed by the lead wire portion 31. For each of the support portions $\mathbf{35}_1$ to $\mathbf{35}_6$, one side extends to the outside of the product area M3 to be connected to the frame portion N3. The support portions $\mathbf{35}_1$ to $\mathbf{35}_6$ are thick plate portions formed with the same thickness as the coupling portion $\mathbf{33}_1$ and the like. The portion extending from each of the support portions $\mathbf{35}_1$ to $\mathbf{35}_6$ is a thin plate portion similar to the connection portions 36. The other side of each of the support portions $\mathbf{35}_1$ to $\mathbf{35}_6$ is not connected to the lead wire portion 31. That is, the support portions $\mathbf{35}_1$ to $\mathbf{35}_6$ and the lead wire portion 31 are electrically independent, and the support portions $\mathbf{35}_1$ to $\mathbf{35}_6$ and the lead wire portion 31 are not electrically connected. The support portions $\mathbf{35}_1$ to $\mathbf{35}_6$ are portions that support thick plate portions of other metal plates.

The support portion $\mathbf{35}_1$ is connected to the same side as the side of the frame portion N3 to which the coupling portion $\mathbf{33}_1$ is connected, and is adjacent to the coupling portion $\mathbf{33}_1$ with a predetermined interval. The support portion $\mathbf{35}_2$ is connected to the same side as the side of the frame portion N3 to which the coupling portion $\mathbf{33}_2$ is connected, and is adjacent to the coupling portion $\mathbf{33}_2$ with a predetermined interval. The support portions $\mathbf{35}_3$ and $\mathbf{35}_4$ are connected to the side opposite to the side of the frame portion N3 to which the coupling portion $\mathbf{33}_1$ is connected and are adjacent to each other with a predetermined interval. The support portions $\mathbf{35}_5$ and $\mathbf{35}_6$ are connected to the side opposite to the side of the frame portion N3 to which the coupling portion $\mathbf{33}_2$ is connected and are adjacent to each other with a predetermined interval.

The upper surfaces of the lead wire portion 31, the connection portions 36, the magnetic core connection portion 37, and the frame portion N3 (the surfaces toward the fourth metal plate 40) and the upper surfaces of the coupling portion $\mathbf{33}_1$, the coupling portion $\mathbf{33}_2$, the magnetic core portion 34, and the support portion $\mathbf{35}_1$ to $\mathbf{35}_6$ (the surfaces toward the fourth metal plate 40) are on a substantially same plane. On the other hand, the lower surfaces of the lead wire portion 31, the connection portions 36, the magnetic core connection portion 37, and the frame portion N3 are at positions recessed toward the fourth metal plate 40 relative to the lower surfaces of the coupling portion $\mathbf{33}_1$, the coupling portion $\mathbf{33}_2$, the magnetic core portion 34, and the support portions $\mathbf{35}_1$ to $\mathbf{35}_6$.

It should be noted that the frame portion N3 may have a first portion having the same thickness as the lead wire portion 31 and the like and a second portion having the same thickness as the coupling portions $\mathbf{33}_1$ and $\mathbf{33}_2$ and the like. For example, as the second portion, in order to strengthen bonding with an adjacent metal plate and prevent the metal plates from being inclined, reinforcement portions 38 may be provided at the four corner portions of the frame portion N3. In this case, the lower surfaces of the reinforcement portions 38 are on a plane that is substantially the same as the lower surfaces of the coupling portions 33$_1$ and 33$_2$. The reinforcement portions 38 can be formed, for example, in an L shape. In order to strengthen the bonding with an adjacent metal plate and prevent the metal plates from being inclined, in place of the reinforcement portions 38 or in addition to the reinforcement portions 38, a second portion (a thick plate portion) may be provided at a portion other than the corner portions of the frame portion N3.

The thicknesses of the coupling portion 33$_1$, the coupling portion 33$_2$, the magnetic core portion 34, and the support portion 35$_1$ to 35$_6$ may be the same as, for example, the terminal portion 12 and the like of the first metal plate 10, and the thicknesses of the lead wire portion 31, the connection portions 36, the magnetic core connection portion 37, and the frame portion N3 may be the same as, for example, the lead wire portion 11 and the like of the first metal plate 10. It should be noted that in a case in which a reinforcement portion 38 is provided on the frame portion N3, the thickness of the reinforcement portion 38 is the same as that of the coupling portion 33$_1$ and the like.

As illustrated in FIG. 4B, the product area M4 of the fourth metal plate 40 includes a lead wire portion 41, a coupling portion 43$_1$, a coupling portion 43$_2$, a magnetic core portion 44, and support portions 45$_1$ to 45$_6$.

The lead wire portion 41 is formed, inside the product area M4, in a partial-loop shape (approximately ¾ turns) that is substantially rectangular, and is connected to a frame portion N4 by a plurality of connection portions 46 (in this case, six connection portions as an example) extending from the inside of the product area M4 to the outside of the product area M4. Although the number of and connection positions of the connection portions 46 may be determined as desired if the lead wire portion 41 can be stably supported with the frame portion N4, it is preferable that the connection portions are arranged near the corner portions of the lead wire portion 41 that has a substantially rectangular shape.

The coupling portion 43$_1$ is formed on a start point 411, which is one end of the lead wire portion 41, and the coupling portion 43$_2$ is formed on an end point 412, which is the other end of the lead wire portion 41. The planar shapes of the coupling portions 43$_1$ and 43$_2$ may be, for example, square shapes or oblong shapes. The lead wire portion 41, the connection portions 46, and the frame portion N4 are thin plate portions formed with a predetermined thickness, and the coupling portions 43$_1$ and 43$_2$ are thick plate portions formed with a same thickness thicker than the lead wire portion 41 and the like. The coupling portion 43$_1$ and the coupling portion 43$_2$ may be collectively referred to as end portion thick plate portions.

The coupling portion 43$_1$ is arranged inside the product area M4. The side of the coupling portion 43$_1$ opposite the connection portion with the start point 411 of the lead wire portion 41 extends to the outside of the product area M4 to be connected to the frame portion N4. The portion extending from the coupling portion 43$_1$ is a thin plate portion similar to the connection portions 46. The coupling portion 43$_2$ is arranged inside the product area M1. The side of the coupling portion 43$_2$ opposite the connection portion with the end point 412 of the lead wire portion 41 extends to the outside of the product area M4 to be connected to the frame portion N4. The portion extending from the coupling portion 43$_2$ is a thin plate portion similar to the connection portions 46. The side of the frame portion N4 to which the coupling portion 43$_1$ is connected is adjacent to and is substantially perpendicular to the side of the frame portion N4 to which the coupling portion 43$_2$ is connected.

The magnetic core portion 44 is arranged inside the partial loop formed by the lead wire portion 41 and is away from the lead wire portion 41. The magnetic core portion 44 is connected, by the magnetic core connection portion 47 extending from the inside of the product area M4 to the outside of the product area M4, to the side that is the same as the side of the frame portion N4 to which the coupling portion 43$_1$ and the support portion 45$_1$ are connected. That is, the magnetic core portion 44 is supported with the frame portion N4 through the magnetic core connection portion 47 provided in an area where the lead wire portion 41 of the fourth metal plate 40 is not arranged. The magnetic core portion 44 is a thick plate portion formed with the same thickness as the coupling portions 43$_1$ and 43$_2$ and is formed in a substantially square shape at a substantially central portion of the product area M4. The magnetic core connection portion 47 is a thin plate portion formed with the same thickness as the lead wire portion 41 and the like. The magnetic core portion 44 is electrically independent of the lead wire portion 41. The magnetic core portion 44 may be referred to as an inside thick plate portion.

The support portions 45$_1$ to 45$_6$ are arranged inside the product area M4 and outside the partial loop formed by the lead wire portion 41. For each of the support portions 45$_1$ to 45$_6$, one side extends to the outside of the product area M4 to be connected to the frame portion N4. The support portions 45$_1$ to 45$_6$ are thick plate portions formed with the same thickness as the coupling portion 43$_1$ and the like. The portion extending from each of the support portions 45$_1$ to 45$_6$ is a thin plate portion similar to the connection portions 46. The other side of each of the support portions 45$_1$ to 45$_6$ is not connected to the lead wire portion 41. That is, the support portions 45$_1$ to 45$_6$ and the lead wire portion 41 are electrically independent, and the support portions 45$_1$ to 45$_6$ and the lead wire portion 41 are not electrically connected. The support portions 45$_1$ to 45$_6$ are portions that support thick plate portions of other metal plates.

The support portion 45$_1$ is connected to the same side as the side of the frame portion N4 to which the coupling portion 43$_1$ is connected, and is adjacent to the coupling portion 43$_1$ with a predetermined interval. The support portion 45$_2$ is connected to the same side as the side of the frame portion N4 to which the coupling portion 43$_2$ is connected, and is adjacent to the coupling portion 43$_2$ with a predetermined interval. The support portions 45$_3$ and 45$_4$ are connected to the side opposite to the side of the frame portion N4 to which the coupling portion 43$_1$ is connected and are adjacent to each other with a predetermined interval. The support portions 45$_5$ and 45$_6$ are connected to the side opposite to the side of the frame portion N4 to which the coupling portion 43$_2$ is connected and are adjacent to each other with a predetermined interval.

The upper surfaces of the lead wire portion 41, the connection portions 46, the magnetic core connection portion 47, and the frame portion N4 (the surfaces toward the fifth metal plate 50) and the upper surfaces of the coupling portion 43$_1$, the coupling portion 43$_2$, the magnetic core portion 44, and the support portion 45$_1$ to 45$_6$ (the surfaces toward the fifth metal plate 50) are on a substantially same plane. On the other hand, the lower surfaces of the lead wire portion 41, the connection portions 46, the magnetic core connection portion 47, and the frame portion N4 are at positions recessed toward the fifth metal plate 50 relative to the lower surfaces of the coupling portion $43_1$, the coupling portion $43_2$, the magnetic core portion 44, and the support portions $45_1$ to $45_6$.

It should be noted that the frame portion N4 may have a first portion having the same thickness as the lead wire portion 41 and the like and a second portion having the same thickness as the coupling portions $43_1$ and $43_2$ and the like. For example, as the second portion, in order to strengthen bonding with an adjacent metal plate and prevent the metal plates from being inclined, reinforcement portions 48 may be provided at the four corner portions of the frame portion N4. In this case, the lower surfaces of the reinforcement portions 48 are on a plane that is substantially the same as the lower surfaces of the coupling portions $43_1$ and $43_2$. The reinforcement portions 48 can be formed, for example, in an L shape. In order to strengthen the bonding with an adjacent metal plate and prevent the metal plates from being inclined, in place of the reinforcement portions 48 or in addition to the reinforcement portions 48, a second portion (a thick plate portion) may be provided at a portion other than the corner portions of the frame portion N4.

The thicknesses of the coupling portion $43_1$, the coupling portion $43_2$, the magnetic core portion 44, and the support portion $45_1$ to $45_6$ may be the same as, for example, the terminal portion 12 and the like of the first metal plate 10, and the thicknesses of the lead wire portion 41, the connection portions 46, the magnetic core connection portion 47, and the frame portion N4 may be the same as, for example, the lead wire portion 11 and the like of the first metal plate 10. It should be noted that in a case in which a reinforcement portion 48 is provided on the frame portion N4, the thickness of the reinforcement portion 48 is the same as that of the coupling portion $43_1$ and the like.

As illustrated in FIG. 5A, the product area M5 of the fifth metal plate 50 includes a lead wire portion 51, a coupling portion $53_1$, a coupling portion $53_2$, a magnetic core portion 54, and support portions $55_1$ to $55_6$.

The lead wire portion 51 is formed, inside the product area M5, in a partial-loop shape (approximately ¾ turns) that is substantially rectangular, and is connected to a frame portion N5 by a plurality of connection portions 56 (in this case, six connection portions as an example) extending from the inside of the product area M5 to the outside of the product area M5. Although the number of and connection positions of the connection portions 56 may be determined as desired if the lead wire portion 51 can be stably supported with the frame portion N5, it is preferable that the connection portions are arranged near the corner portions of the lead wire portion 51 that has a substantially rectangular shape.

The coupling portion $53_1$ is formed on a start point 511, which is one end of the lead wire portion 51, and the coupling portion $53_2$ is formed on an end point 512, which is the other end of the lead wire portion 51. The planar shapes of the coupling portions $53_1$ and $53_2$ may be, for example, square shapes or oblong shapes. The lead wire portion 51, the connection portions 56, and the frame portion N5 are thin plate portions formed with a predetermined thickness, and the coupling portions $53_1$ and $53_2$ are thick plate portions formed with a same thickness thicker than the lead wire portion 51 and the like. The coupling portion $53_1$ and the coupling portion $53_2$ may be collectively referred to as end portion thick plate portions.

The coupling portion $53_1$ is arranged inside the product area M5. The side of the coupling portion $53_1$ opposite the connection portion with the start point 511 of the lead wire portion 51 extends to the outside of the product area M5 to be connected to the frame portion N5. The portion extending from the coupling portion $53_1$ is a thin plate portion similar to the connection portions 56. The coupling portion $53_2$ is arranged inside the product area M5. The side of the coupling portion $53_2$ opposite the connection portion with the end point 512 of the lead wire portion 51 extends to the outside of the product area M5 to be connected to the frame portion N5. The portion extending from the coupling portion $53_2$ is a thin plate portion similar to the connection portions 56. The side of the frame portion N5 to which the coupling portion $53_1$ is connected is adjacent to and is substantially perpendicular to the side of the frame portion N5 to which the coupling portion $53_2$ is connected.

The magnetic core portion 54 is arranged inside the partial loop formed by the lead wire portion 51 and is away from the lead wire portion 51. The magnetic core portion 54 is connected, by the magnetic core connection portion 57 extending from the inside of the product area M5 to the outside of the product area M5, to the side that is the same as the side of the frame portion N5 to which the coupling portion $53_1$ and the support portion $55_1$ are connected. That is, the magnetic core portion 54 is supported with the frame portion N5 through the magnetic core connection portion 57 provided in an area where the lead wire portion 51 of the fifth metal plate 50 is not arranged. The magnetic core portion 54 is a thick plate portion formed with the same thickness as the coupling portions $53_1$ and $53_2$ and is formed in a substantially square shape at a substantially central portion of the product area M5. The magnetic core connection portion 57 is a thin plate portion formed with the same thickness as the lead wire portion 51 and the like. The magnetic core portion 54 is electrically independent of the lead wire portion 51. The magnetic core portion 54 may be referred to as an inside thick plate portion.

The support portions $55_1$ to $55_6$ are arranged inside the product area M5 and outside the partial loop formed by the lead wire portion 51. For each of the support portions $55_1$ to $55_6$, one side extends to the outside of the product area M5 to be connected to the frame portion N5. The support portions $55_1$ to $55_6$ are thick plate portions formed with the same thickness as the coupling portion $53_1$ and the like. The portion extending from each of the support portions $55_1$ to $55_6$ is a thin plate portion similar to the connection portions 56. The other side of each of the support portions $55_1$ to $55_6$ is not connected to the lead wire portion 51. That is, the support portions $55_1$ to $55_6$ and the lead wire portion 51 are electrically independent, and the support portions $55_1$ to $55_6$ and the lead wire portion 51 are not electrically connected. The support portions $55_1$ to $55_6$ are portions that support thick plate portions of other metal plates.

The support portion $55_1$ is connected to the same side as the side of the frame portion N5 to which the coupling portion $53_1$ is connected, and is adjacent to the coupling portion $53_1$ with a predetermined interval. The support portion $55_2$ is connected to the same side as the side of the frame portion N5 to which the coupling portion $53_2$ is connected, and is adjacent to the coupling portion $53_2$ with a predetermined interval. The support portions $55_3$ and $55_4$ are connected to the side opposite to the side of the frame portion N5 to which the coupling portion $53_1$ is connected and are adjacent to each other with a predetermined interval. The support portions $55_5$ and $55_6$ are connected to the side opposite to the side of the frame portion N5 to which the coupling portion $53_2$ is connected and are adjacent to each other with a predetermined interval.

The upper surfaces of the lead wire portion 51, the connection portions 56, the magnetic core connection portion 57, and the frame portion N5 (the surfaces toward the sixth metal plate 60) and the upper surfaces of the coupling portion $53_1$, the coupling portion $53_2$, the magnetic core portion 54, and the support portion $55_1$ to $55_6$ (the surfaces toward the sixth metal plate 60) are on a substantially same plane. On the other hand, the lower surfaces of the lead wire portion 51, the connection portions 56, the magnetic core connection portion 57, and the frame portion N5 are at positions recessed toward the sixth metal plate 60 relative to the lower surfaces of the coupling portion $53_1$, the coupling portion $53_2$, the magnetic core portion 54, and the support portions $55_1$ to $55_6$.

It should be noted that the frame portion N5 may have a first portion having the same thickness as the lead wire portion 51 and the like and a second portion having the same thickness as the coupling portions $53_1$ and $53_2$ and the like. For example, as the second portion, in order to strengthen bonding with an adjacent metal plate and prevent the metal plates from being inclined, reinforcement portions 58 may be provided at the four corner portions of the frame portion N5. In this case, the lower surfaces of the reinforcement portions 58 are on a plane that is substantially the same as the lower surfaces of the coupling portions $53_1$ and $53_2$ and the like. The reinforcement portions 58 can be formed, for example, in an L shape. In order to strengthen the bonding with an adjacent metal plate and prevent the metal plates from being inclined, in place of the reinforcement portions 58 or in addition to the reinforcement portions 58, a second portion (a thick plate portion) may be provided at a portion other than the corner portions of the frame portion N5.

The thicknesses of the coupling portion $53_1$, the coupling portion $53_2$, the magnetic core portion 54, and the support portion $55_1$ to $55_6$ may be the same as, for example, the terminal portion 12 and the like of the first metal plate 10, and the thicknesses of the lead wire portion 51, the connection portions 56, the magnetic core connection portion 57, and the frame portion N5 may be the same as, for example, the lead wire portion 11 and the like of the first metal plate 10. It should be noted that in a case in which a reinforcement portion 58 is provided on the frame portion N5, the thickness of the reinforcement portion 58 is the same as that of the coupling portion $53_1$ and the like.

As illustrated in FIG. 5B, the product area M6 of the sixth metal plate 60 includes a lead wire portion 61, a terminal portion 62, a coupling portion 63, a magnetic core portion 64, and support portions $65_1$ to $65_6$.

The lead wire portion 61 is formed, inside the product area M6, in a partial-loop shape (approximately ¾ turns) that is substantially rectangular, and is connected to a frame portion N6 by a plurality of connection portions 66 (in this case, six connection portions as an example) extending from the inside of the product area M6 to the outside of the product area M6. Although the number and connection positions of the connection portions 66 may be determined as desired if the lead wire portion 61 can be stably supported with the frame portion N6, it is preferable that the connection portions are arranged near the corner portions of the lead wire portion 61 that has a substantially rectangular shape.

The coupling portion 63 is formed on a start point 611, which is one end of the lead wire portion 61, and the terminal portion 62 is formed on an end point 612, which is the other end of the lead wire portion 61. The planar shapes of the terminal portion 62 and coupling portion 63 may be, for example, square shapes or oblong shapes. The lead wire portion 61, the connection portions 66, and the frame portion N6 are thin plate portions formed with a predetermined thickness, and the terminal portion 62 and the coupling portion 63 are thick plate portions formed with a same thickness thicker than the lead wire portion 61 and the like. The terminal portion 62 and the coupling portion 63 may be collectively referred to as end portion thick plate portions.

The coupling portion 63 is arranged inside the product area M6. The side of the coupling portion 63 opposite the connection portion with the start point 611 of the lead wire portion 61 extends to the outside of the product area M6 to be connected to the frame portion N6. The portion extending from the coupling portion 63 is a thin plate portion similar to the connection portions 66. The portion extending from the terminal portion 62 is a thin plate portion similar to the connection portions 66. The side of the frame portion N6 to which the terminal portion 62 is connected is adjacent to and is substantially perpendicular to the side of the frame portion N6 to which the coupling portion 63 is connected.

The magnetic core portion 64 is arranged inside the partial loop formed by the lead wire portion 61 and is away from the lead wire portion 61. The magnetic core portion 64 is connected, by the magnetic core connection portion 67 extending from the inside of the product area M6 to the outside of the product area M6, to the side that is the same as the side of the frame portion N6 to which the coupling portion 63 and the support portion $65_6$ are connected. That is, the magnetic core portion 64 is supported with the frame portion N6 through the magnetic core connection portion 67 provided in an area where the lead wire portion 61 of the sixth metal plate 60 is not arranged. The magnetic core portion 64 is a thick plate portion formed with the same thickness as the terminal portion 62 and the coupling portion 63 and is formed in a substantially square shape at a substantially central portion of the product area M6. The magnetic core connection portion 67 is a thin plate portion formed with the same thickness as the lead wire portion 61 and the like. The magnetic core portion 64 is electrically independent of the lead wire portion 61. The magnetic core portion 64 may be referred to as an inside thick plate portion.

The support portions $65_1$ to $65_6$ are arranged inside the product area M6 and outside the partial loop formed by the lead wire portion 61. For each of the support portions $65_1$ to $65_6$, one side extends to the outside of the product area M6 to be connected to the frame portion N6. The support portions $65_1$ to $65_6$ are thick plate portions formed with the same thickness as the terminal portion 62 and the coupling portion 63. The portion extending from each of the support portions $65_1$ to $65_6$ is a thin plate portion similar to the connection portions 66. The other side of each of the support portions $65_1$ to $65_6$ is not connected to the lead wire portion 61. That is, the support portions $65_1$ to $65_6$ and the lead wire portion 61 are electrically independent, and the support portions $65_1$ to $65_6$ and the lead wire portion 61 are not electrically connected. The support portions $65_1$ to $65_6$ are portions that support thick plate portions of other metal plates.

The support portion $65_1$ is connected to the same side as the side of the frame portion N6 to which the terminal portion 62 is connected, and is adjacent to the terminal portion 62 with a predetermined interval. The support portion $65_6$ is connected to the same side as the side of the frame portion N6 to which the coupling portion 63 is connected, and is adjacent to the coupling portion 63 with a predetermined interval. The support portions $65_4$ and $65_5$ are connected to the side opposite to the side of the frame portion N6 to which the terminal portion 62 is connected and are adjacent to each other with a predetermined interval. The support portions $65_2$ and $65_3$ are connected to the side opposite to the side of the frame portion N6 to which the coupling portion 63 is connected and are adjacent to each other with a predetermined interval.

The upper surfaces of the lead wire portion 61, the connection portions 66, the magnetic core connection portion 67, and the frame portion N6 (the surfaces on the side opposite from the fifth metal plate 50) and the upper surfaces of the terminal portion 62, the coupling portion 63, the magnetic core portion 64, and the support portion $65_1$ to $65_6$ (the surfaces on the side opposite from the fifth metal plate 50) are on a substantially same plane. On the other hand, the lower surfaces of the lead wire portion 61, the connection portions 66, the magnetic core connection portion 67, and the frame portion N6 are at positions recessed toward a direction opposite from the fifth metal plate 50 relative to the lower surfaces of the terminal portion 62, the coupling portion 63, the magnetic core portion 64, and the support portion $65_1$ to $65_6$.

It should be noted that the frame portion N6 may have a first portion having the same thickness as the lead wire portion 61 and the like and a second portion having the same thickness as the terminal portion 62 and the like. For example, as the second portion, in order to strengthen bonding with an adjacent metal plate and prevent the metal plates from being inclined, reinforcement portions 68 may be provided at the four corner portions of the frame portion N6. In this case, the lower surfaces of the reinforcement portions 68 are on a plane that is substantially the same as the lower surface of the terminal portion 62 and the like. The reinforcement portions 68 can be formed, for example, in an L shape. In order to strengthen the bonding with an adjacent metal plate and prevent the metal plates from being inclined, in place of the reinforcement portions 68 or in addition to the reinforcement portions 68, a second portion (a thick plate portion) may be provided at a portion other than the corner portions of the frame portion N6.

The thicknesses of the terminal portion 62, the coupling portion 63, the magnetic core portion 64, and the support portion $65_1$ to $65_6$ may be the same as, for example, the terminal portion 12 and the like of the first metal plate 10, and the thicknesses of the lead wire portion 61, the connection portions 66, the magnetic core connection portion 67, and the frame portion N6 may be the same as, for example, the lead wire portion 11 and the like of the first metal plate 10. It should be noted that in a case in which a reinforcement portion 68 is provided on the frame portion N6, the thickness of the reinforcement portion 68 is the same as that of the coupling portion 63 and the like.

Figure 7A:
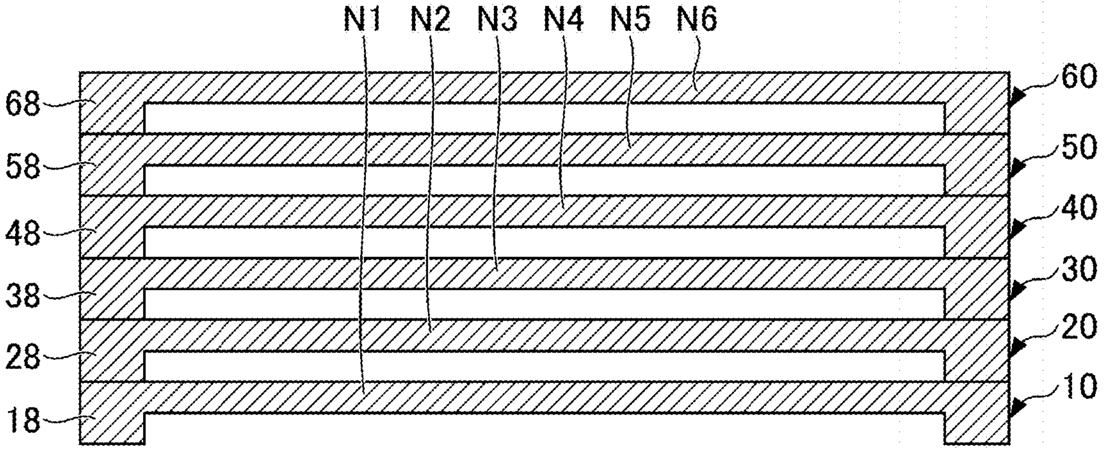
FIGS. 7A and 7B are cross sectional views of the coil structure taken along the lines A-A and B-B in FIG. 3A, respectively.
Figure 7B:
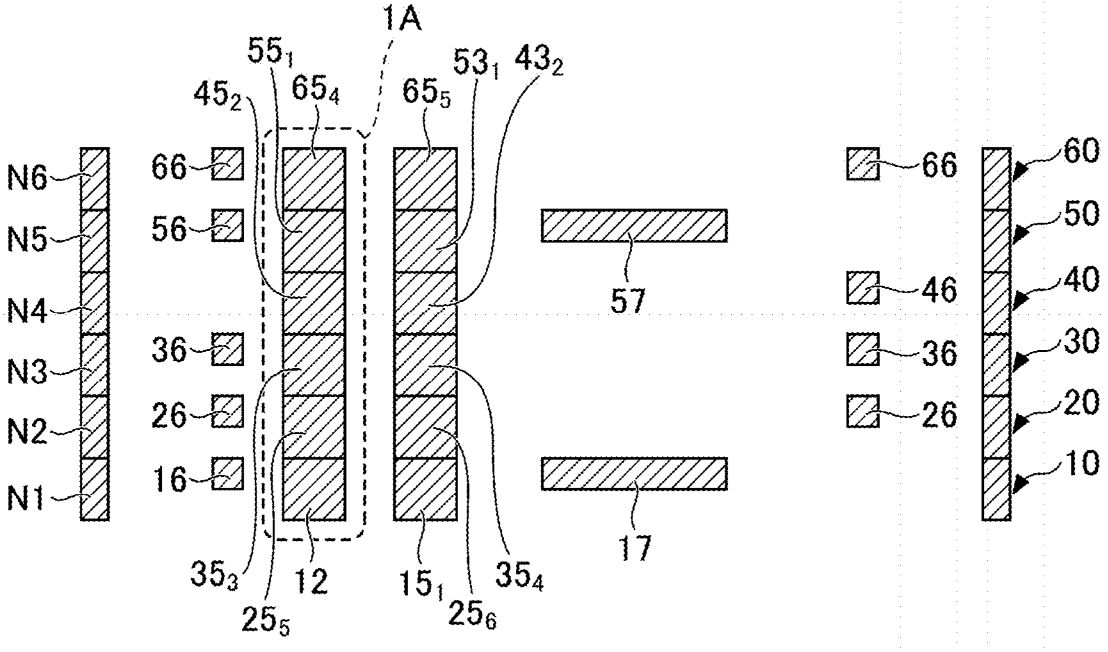
Figure 8A:
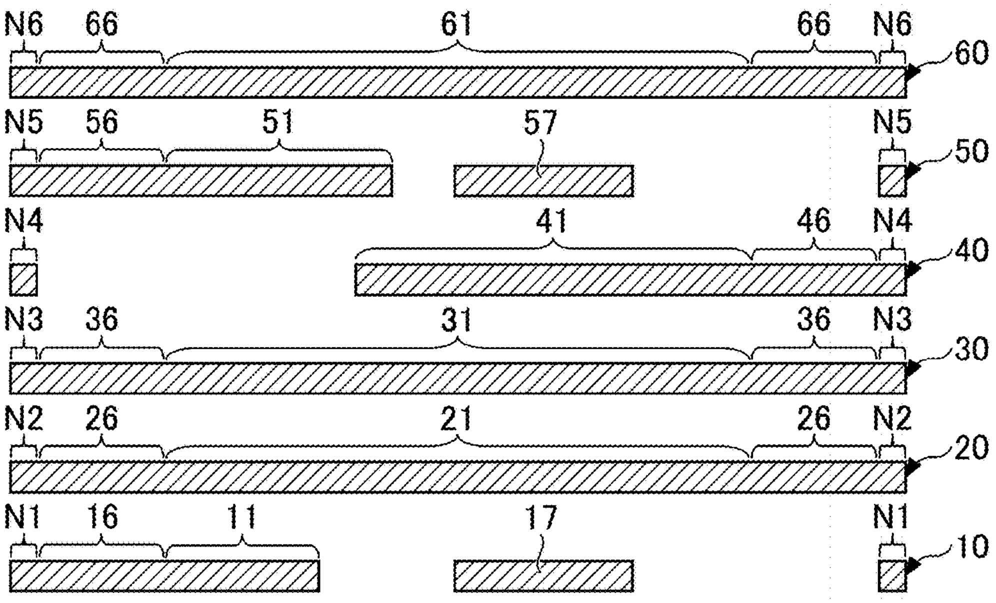
FIGS. 8A and 8B are cross sectional views of the coil structure taken along the lines C-C and D-D in FIG. 3A, respectively.
Figure 8B:
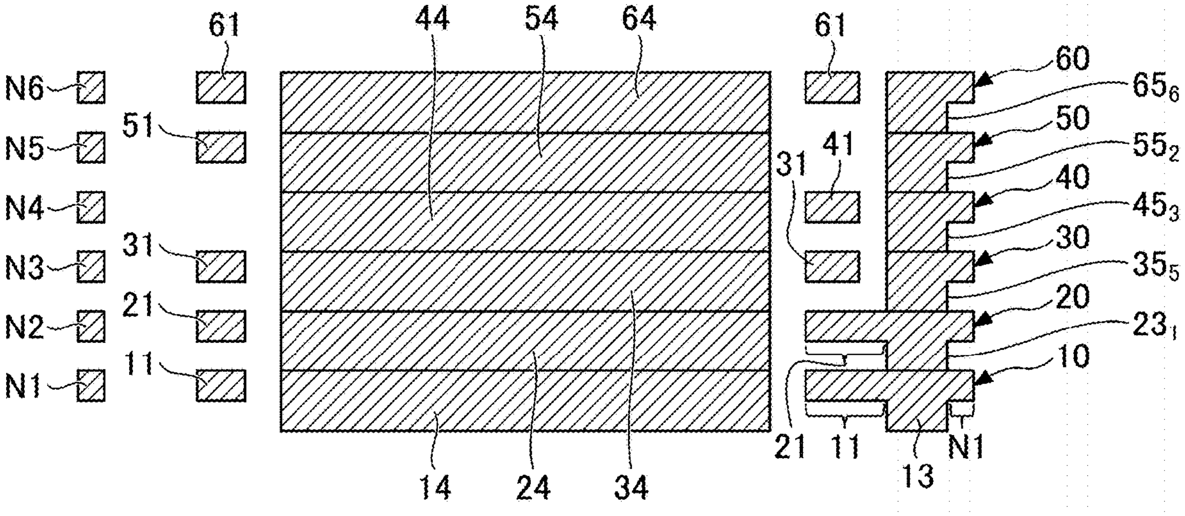
Figure 9A:
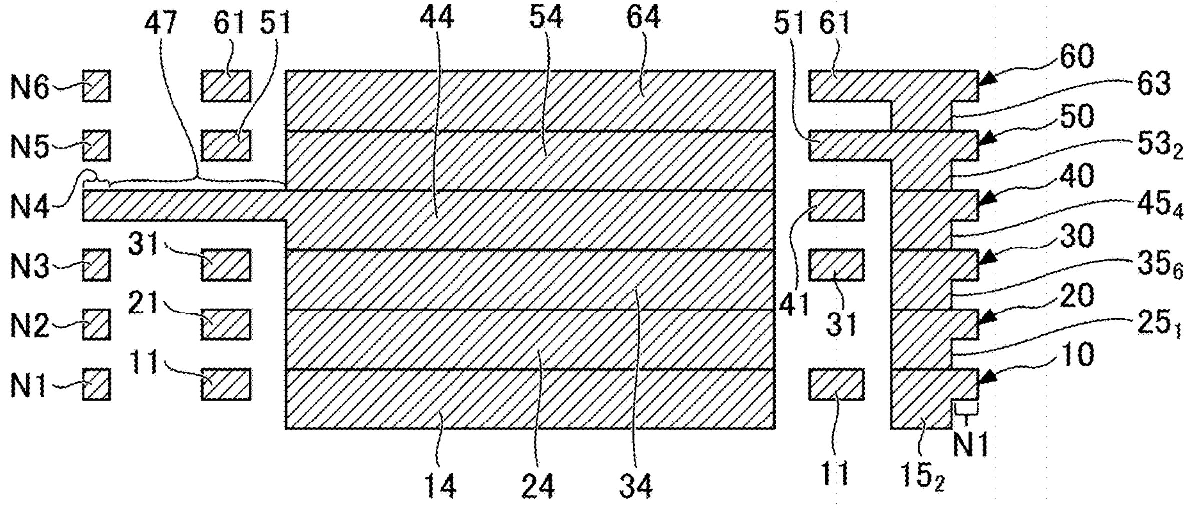
FIGS. 9A and 9B are cross sectional views of the coil structure taken along the lines E-E and F-F in FIG. 3A, respectively.
Figure 9B:
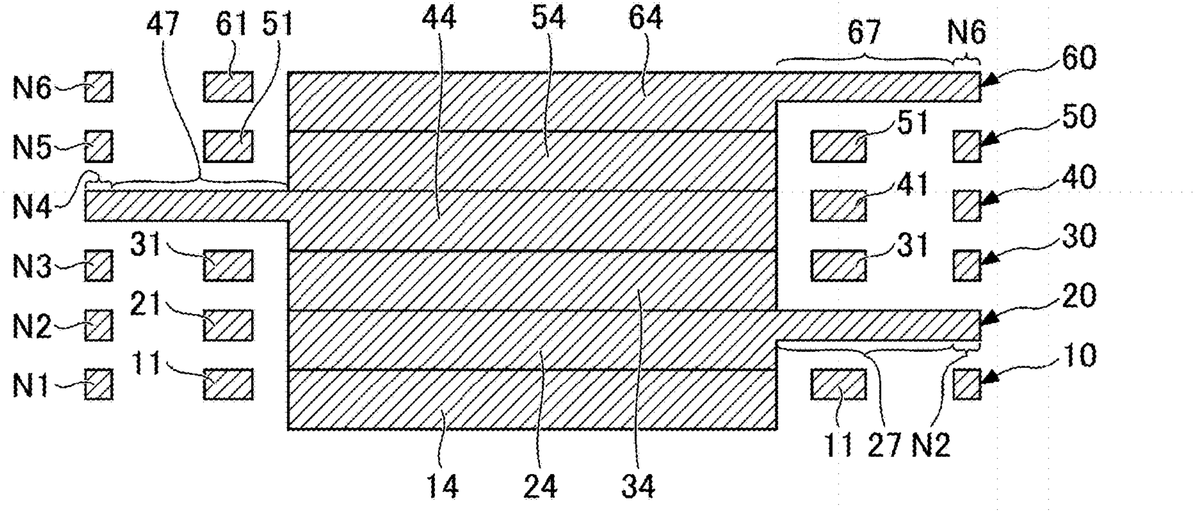
Figure 10A:
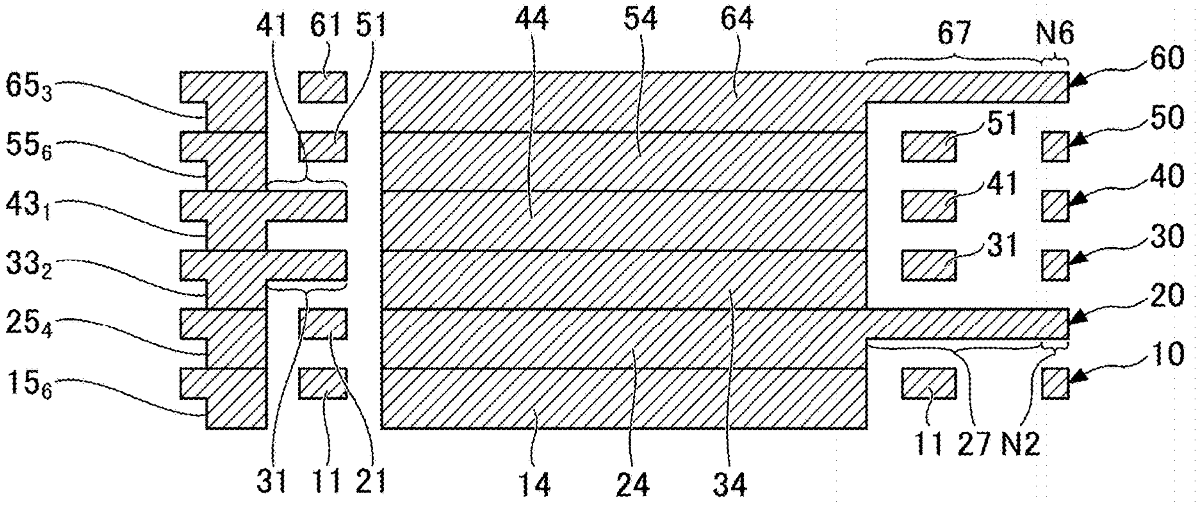
FIGS. 10A and 10B are cross sectional views of the coil structure taken along the lines G-G and H-H in FIG. 3A, respectively.
Figure 10B:
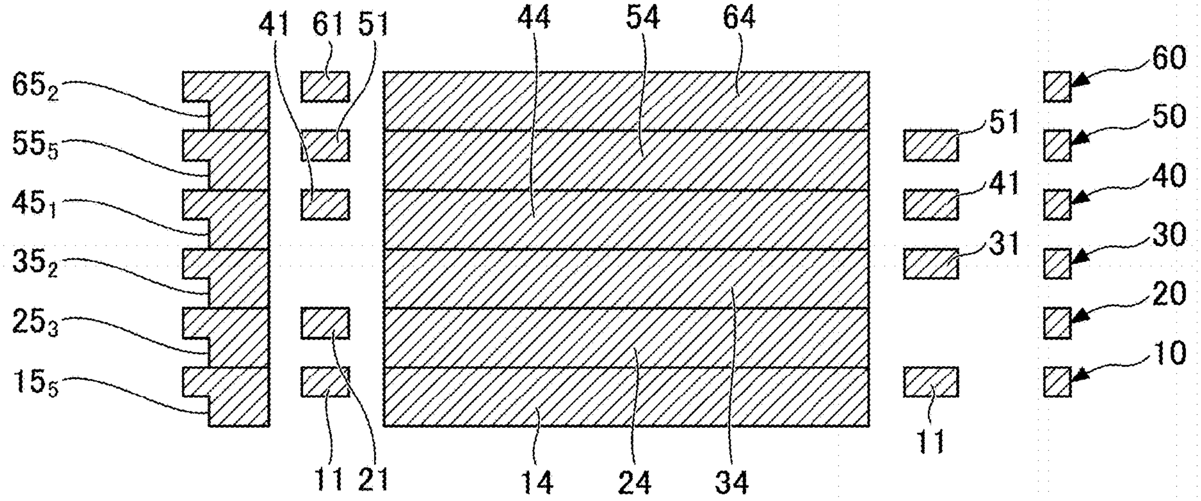
Figure 11A:
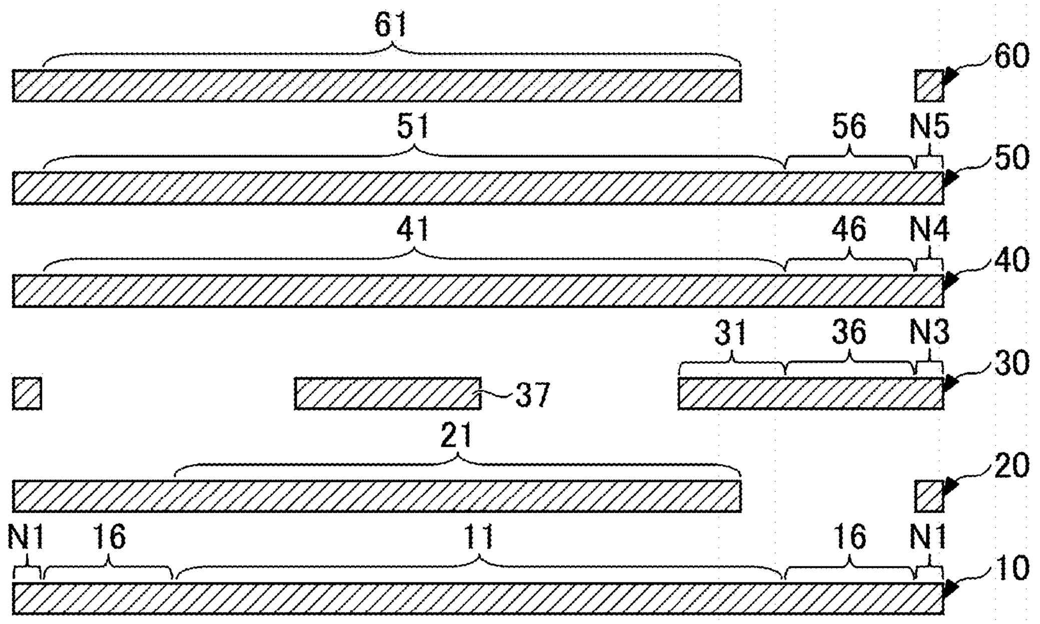
FIGS. 11A and 11B are cross sectional views of the coil structure taken along the lines I-I and J-J in FIG. 3A, respectively.
Figure 11B:
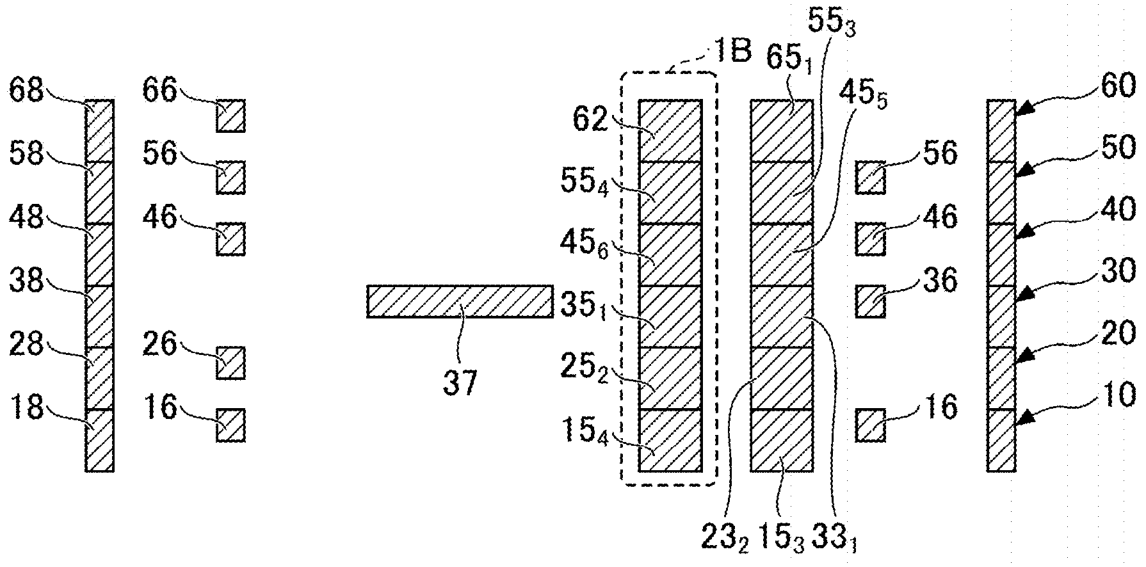
Figure 12:
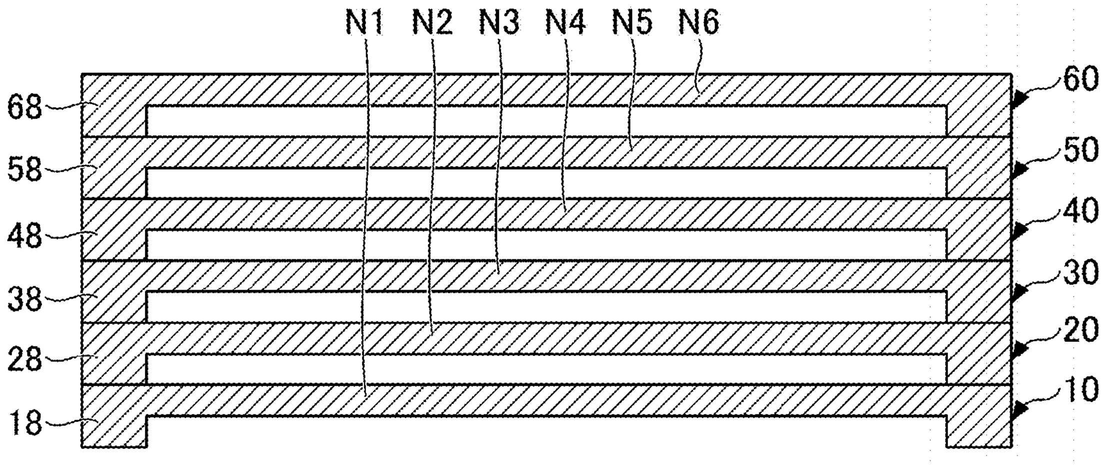
FIG. 12 is a cross sectional view of the coil structure taken along the line K-K in FIG. 3A.

FIGS. 7A and 7B are cross sectional views of the coil structure 1 taken along the lines A-A and B-B in FIG. 3A, respectively. FIGS. 8A and 8B are cross sectional views of the coil structure 1 taken along the lines C-C and D-D in FIG. 3A, respectively. FIGS. 9A and 9B are cross sectional views of the coil structure 1 taken along the lines E-E and F-F in FIG. 3A, respectively. FIGS. 10A and 10B are cross sectional views of the coil structure 1 taken along the lines G-G and H-H in FIG. 3A, respectively. FIGS. 11A and 11B are cross sectional views of the coil structure 1 taken along the lines I-I and J-J in FIG. 3A, respectively. FIG. 12 is a cross sectional view of the coil structure 1 taken along the line K-K in FIG. 3A. It should be noted that in FIG. 7A to FIG. 12, the illustration of some of the reference numerals are omitted for the sake of convenience.

Referring to FIG. 7A to FIG. 12 in addition to FIG. 1A to FIG. 6K, adjacent metal plates are bonded to each other in the coil structure 1. Adjacent metal plates can be bonded together, for example, by diffusion bonding. The diffusion bonding is suitable for reducing voltage losses that occur at the bonded portion because the upper and lower metal plates can be bonded without interposing a material having different electrical conductivity or thermal conductivity, such as solder.

Specifically, the second metal plate 20 is layered on the first metal plate 10, and the thick plate portions of both plates are bonded to each other. That is, the support portion $25_5$ is bonded on the terminal portion 12, the coupling portion $23_1$ is layered on the coupling portion 13, the support portion $25_6$ is layered on the support portion $15_1$, the support portion $25_1$ is layered on the support portion $15_2$, the coupling portion $23_2$ is layered on the support portion $15_3$, the support portion $25_2$ is layered on the support portion $15_4$, the support portion $25_3$ is layered on the support portion $15_5$, and the support portion $25_4$ is layered on the support portion $15_6$. The magnetic core portion 24 is also bonded on the magnetic core portion 14. Also, the respective reinforcement portions 28 are bonded on the respective reinforcement portions 18.

Thus, the coupling portion 13, which is connected to the end point 112 of the lead wire portion 11, and the coupling portion $23_1$, which is connected to the start point 211 of the lead wire portion 21, are electrically connected with each other, and the lead wire portion 11 and the lead wire portion 21 are connected in series. Also, because the lead wire portion 11 and the lead wire portion 21 are formed to be thinner than the terminal portion 12, the coupling portion $23_1$, and the like, the upper surface of the lead wire portion 11 and the lower surface of the lead wire portion 21 do not come into contact with each other. Also, because any of the thick plate portions of the first metal plate 10 is absolutely arranged on the lower side of each thick plate portion of the second metal plate 20, the upper and lower metal plates can be easily bonded together.

Similarly, the third metal plate 30 is layered on the second metal plate 20, and the thick plate portions of both plates are bonded to each other. That is, the support portion $35_5$ is bonded on the coupling portion $23_1$, the coupling portion $33_1$ is layered on the coupling portion $23_2$, the support portion $35_6$ is layered on the support portion $25_1$, the support portion $35_1$ is layered on the support portion $25_2$, the support portion $35_2$ is layered on the support portion $25_3$, the coupling portion $33_2$ is layered on the support portion $25_4$, the support portion $35_3$ is layered on the support portion $25_5$, and the support portion $35_4$ is layered on the support portion $25_6$. The magnetic core portion 34 is also bonded on the magnetic core portion 24. Also, the respective reinforcement portions 38 are bonded on the respective reinforcement portions 28.

Thus, the coupling portion $23_2$, which is connected to the end point 212 of the lead wire portion 21, and the coupling portion $33_1$, which is connected to the start point 311 of the lead wire portion 31, are electrically connected with each other, and the lead wire portion 21 and the lead wire portion 31 are connected in series. Also, because the lead wire portion 21 and the lead wire portion 31 are formed to be thinner than the coupling portion $23_1$, the coupling portion $33_1$, and the like, the upper surface of the lead wire portion 21 and the lower surface of the lead wire portion 31 do not come into contact with each other. Also, because any of the thick plate portions of the second metal plate 20 is necessarily arranged on the lower side of each thick plate portion of the third metal plate 30, the upper and lower metal plates can be easily bonded together.

Similarly, the fourth metal plate 40 is layered on the third metal plate 30, and the thick plate portions of both plates are bonded to each other. That is, the support portion $45_5$ is bonded on the coupling portion $33_1$, the coupling portion $43_1$ is layered on the coupling portion $33_2$, the support portion $45_6$ is layered on the support portion $35_1$, the support portion $45_1$ is layered on the support portion $35_2$, the support portion $45_2$ is layered on the support portion $35_3$, the coupling portion $43_2$ is layered on the support portion $35_4$, the support portion $45_3$ is layered on the support portion $35_5$, and the support portion $45_4$ is layered on the support portion $35_6$. The magnetic core portion 44 is also bonded on the magnetic core portion 34. Also, the respective reinforcement portions 48 are bonded on the respective reinforcement portions 38.

Thus, the coupling portion $33_2$, which is connected to the end point 312 of the lead wire portion 31, and the coupling portion $43_1$, which is connected to the start point 411 of the lead wire portion 41, are electrically connected with each other, and the lead wire portion 31 and the lead wire portion 41 are connected in series. Also, because the lead wire portion 31 and the lead wire portion 41 are formed to be thinner than the coupling portion $33_1$, the coupling portion $43_1$, and the like, the upper surface of the lead wire portion 31 and the lower surface of the lead wire portion 41 do not come into contact with each other. Also, because any of the thick plate portions of the third metal plate 30 is necessarily arranged on the lower side of each thick plate portion of the fourth metal plate 40, the upper and lower metal plates can be easily bonded together.

Similarly, the fifth metal plate 50 is layered on the fourth metal plate 40, and the thick plate portions of both plates are bonded to each other. That is, the support portion $55_6$ is bonded on the coupling portion $43_1$, the coupling portion $53_1$ is layered on the coupling portion $43_2$, the support portion $55_5$ is layered on the support portion $45_1$, the support portion $55_1$ is layered on the support portion $45_2$, the support portion $55_2$ is layered on the support portion $45_3$, the coupling portion $53_2$ is layered on the support portion $45_4$, the support portion $55_3$ is layered on the support portion $45_5$ and the support portion $55_4$ is layered on the support portion $45_6$. The magnetic core portion 54 is also bonded on the magnetic core portion 44. Also, the respective reinforcement portions 58 are bonded on the respective reinforcement portions 48.

Thus, the coupling portion $43_2$, which is connected to the end point 412 of the lead wire portion 41, and the coupling portion $53_1$, which is connected to the start point 511 of the lead wire portion 51, are electrically connected with each other, and the lead wire portion 41 and the lead wire portion 51 are connected in series. Also, because the lead wire portion 41 and the lead wire portion 51 are formed to be thinner than the coupling portion $43_1$, the coupling portion $53_1$, and the like, the upper surface of the lead wire portion 41 and the lower surface of the lead wire portion 51 do not come into contact with each other. Also, because any of the thick plate portions of the fourth metal plate 40 is necessarily arranged on the lower side of each thick plate portion of the fifth metal plate 50, the upper and lower metal plates can be easily bonded together.

Similarly, the sixth metal plate 60 is layered on the fifth metal plate 50, and the thick plate portions of both plates are bonded to each other. That is, the support portion $65_5$ is bonded on the coupling portion $53_1$, the coupling portion 63 is layered on the coupling portion $53_2$, the support portion $65_4$ is layered on the support portion $55_1$, the support portion $65_6$ is layered on the support portion $55_2$, the support portion $65_1$ is layered on the support portion $55_3$, the terminal portion 62 is layered on the support portion $55_4$, the support portion $65_2$ is layered on the support portion $55_5$ and the support portion $65_3$ is layered on the support portion $55_6$. The magnetic core portion 64 is also bonded on the magnetic core portion 54. Also, the respective reinforcement portions 68 is bonded on the respective reinforcement portions 58.

Thus, the coupling portion $53_2$, which is connected to the end point 512 of the lead wire portion 51, and the coupling portion 63, which is connected to the start point 611 of the lead wire portion 61, are electrically connected with each other, and the lead wire portion 51 and the lead wire portion 61 are connected in series. Also, because the lead wire portion 51 and the lead wire portion 61 are formed to be thinner than the terminal portion 62, the coupling portion 63, and the like, the upper surface of the lead wire portion 51 and the lower surface of the lead wire portion 61 do not come into contact with each other. Also, because any of the thick plate portions of the fifth metal plate 50 is necessarily arranged on the lower side of each thick plate portion of the sixth metal plate 60, the upper and lower metal plates can be easily bonded together.

According to the structure described above, in the coil structure 1, the end point 112 of the lead wire portion 11 and the start point 211 of the lead wire portion 21, the end point 212 of the lead wire portion 21 and the start point 311 of the lead wire portion 31, the end point 312 of the lead wire portion 31 and the start point 411 of the lead wire portion 41, the end point 412 of the lead wire portion 41 and the start point 511 of the lead wire portion 51, and the end point 512 of the lead wire portion 51 and the start point 611 of the lead wire portion 61 are sequentially connected. Thereby, a single coil having a partial-loop shape is formed from the start point 111 of the lead wire portion 11 to the end point 612 of the lead wire portion 61. Also, in the coil structure 1, the magnetic core portions 14, 24, 34, 44, 54, and 64 are sequentially layered and a magnetic core C is formed inside the single helical coil.

FIGS. 13 and 14 are diagrams illustrating manufacturing steps of a coil structure according to the first embodiment. It should be noted that FIGS. 13 and 14 are cross-sectional views corresponding to the B-B line of FIG. 3A, and only illustrate one product area.

Figure 13A:
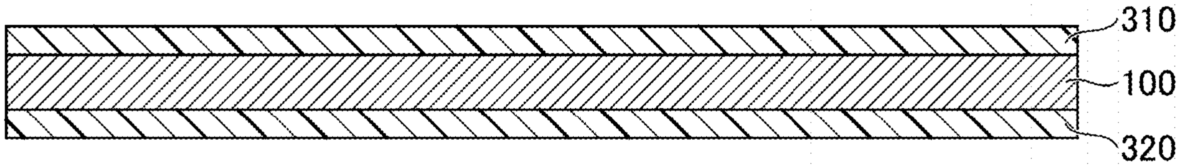
FIGS. 13A to 13C are diagrams (part 1) illustrating an example of manufacturing steps of the coil structure according to the first embodiment.

First, in the step illustrated in FIG. 13A, a plate-shaped metal 100 having a constant thickness and a planar shape illustrated in FIG. 3A is prepared. The plate-shaped metal 100 is a member to be ultimately a first metal plate 10 and may be formed of, for example, copper, a copper alloy, 42 alloy, a Fe—Ni alloy, or the like. The thickness of the plate-shaped metal 100 may be, for example, approximately in the range of 50 μm to 500 μm. A plurality of product areas are defined in the plate-shaped metal 100. Then, a resist layer 310 is formed on the entire upper surface of the plate-shaped metal 100, and a resist layer 320 is formed on the entire lower surface of the plate-shaped metal 100. The resist layers 310 and 320 can be formed, for example, by laminating a photosensitive dry film resist.

Figure 13B:
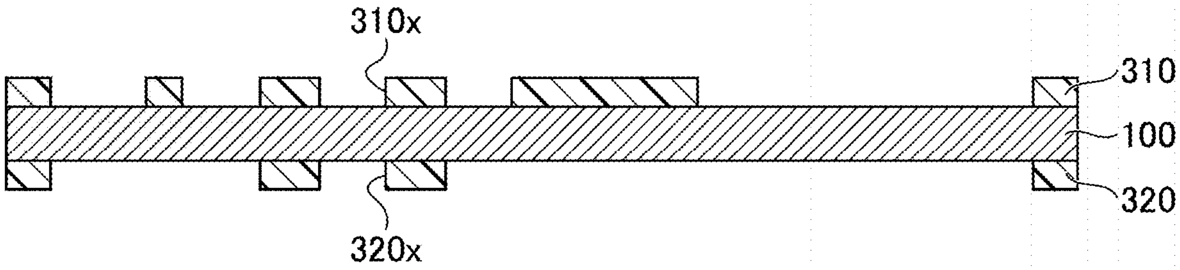

Next, in the step illustrated in FIG. 13B, the resist layer 310 is exposed and developed to form an opening portion 310*x* that selectively exposes the upper surface of the plate-shaped metal 100. The resist layer 320 is also exposed and developed to form an opening portion 320*x* that selectively exposes the lower surface of the plate-shaped metal 100.

Figure 13C:
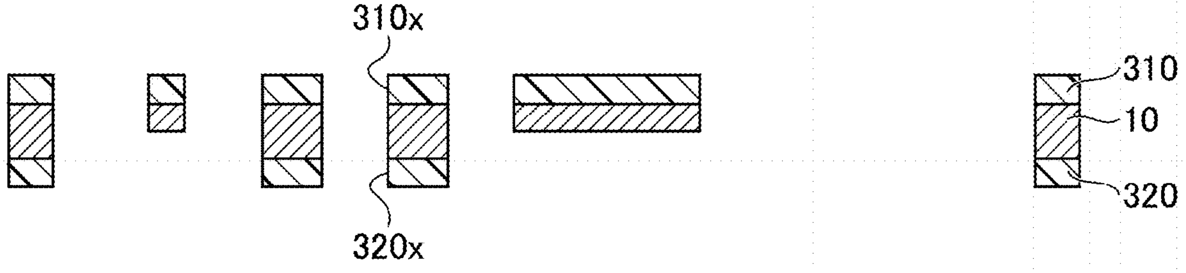

Next, in the step illustrated in FIG. 13C, the plate-shaped metal 100 exposed in the opening portion 310*x* is half etched from the upper surface side, while the plate-shaped metal 100 exposed in the opening portion 320*x* is half etched from the lower surface side. As a result, the plate-shaped metal 100 is patterned, and a first metal plate 10 having portions such as a lead wire portion 11 and a terminal portion 12 is formed.

It should be noted that, in the plate-shaped metal 100, an area where the resist layers 310 and 320 overlap in plan view maintains the original thickness without being etched, and this portion becomes a thick plate portion. Also, an area where the resist layers 310 and 320 are not formed in plan view is half-etched from both sides to be penetrated. Also, an area where only the resist layer 310 is formed in plan view is half-etched only from the lower side, resulting in a thin plate portion having a thickness of approximately half that of the original portion. In a case in which the plate-shaped metal 100 is copper, for example, a ferric chloride solution may be used for half etching.

Figure 14A:
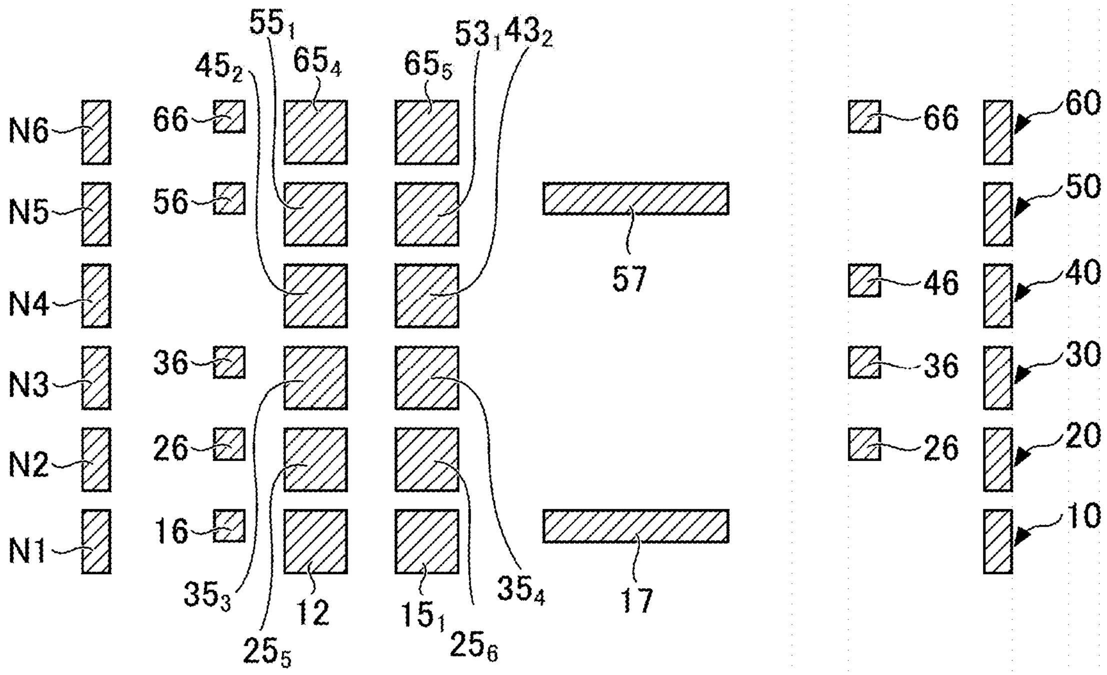
FIGS. 14A and 14B are diagrams (part 2) illustrating an example of manufacturing steps of the coil structure according to the first embodiment.

Next, in the step illustrated in FIG. 14A, a second metal plate 20, a third metal plate 30, a fourth metal plate 40, a fifth metal plate 50, and a sixth metal plate 60 are manufactured in the same manner as in FIG. 13A to FIG. 13C. The planar shapes of the respective metal plates become as illustrated in FIG. 3B to FIG. 5B, and the cross-sectional shapes of the respective metal plates become as illustrated in FIG. 6A to FIG. 12.

Figure 14B:
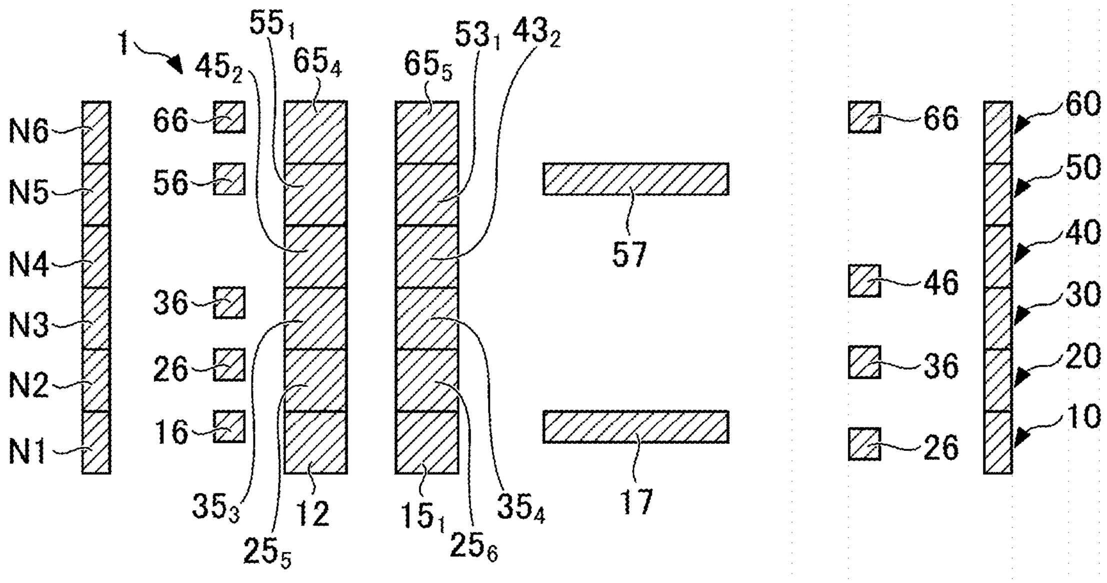

Next, in the step illustrated in FIG. 14B, the respective metal plates are layered, and the thick plate portions of the adjacent metal plates are bonded to each other. Specifically, a layered structure is formed by layering the respective metal plates in the order illustrated in FIG. 14B. The layered structure is pressed in the vertical direction in a vacuum atmosphere and heated to perform diffusion bonding. As a result, the thick plate portions of the adjacent metal plates are directly bonded to each other, and a coil structure 1 is completed. At the time of diffusion bonding, one of the thick plate portions at the lower layer is necessarily arranged on the lower side of each thick plate portion except the lowest layer. Therefore, the bonding of each thick plate portion can be carried out collectively. It should be noted that the materials of the respective metal plates are preferably the same so that the adjacent metal plates can be favorably bonded to each other by diffusion bonding.

Although the coil structure 1 is completed in the above-described steps, an inductor 2 can be manufactured by subsequently executing steps illustrated in FIGS. 15A and 15B.

Figure 15A:
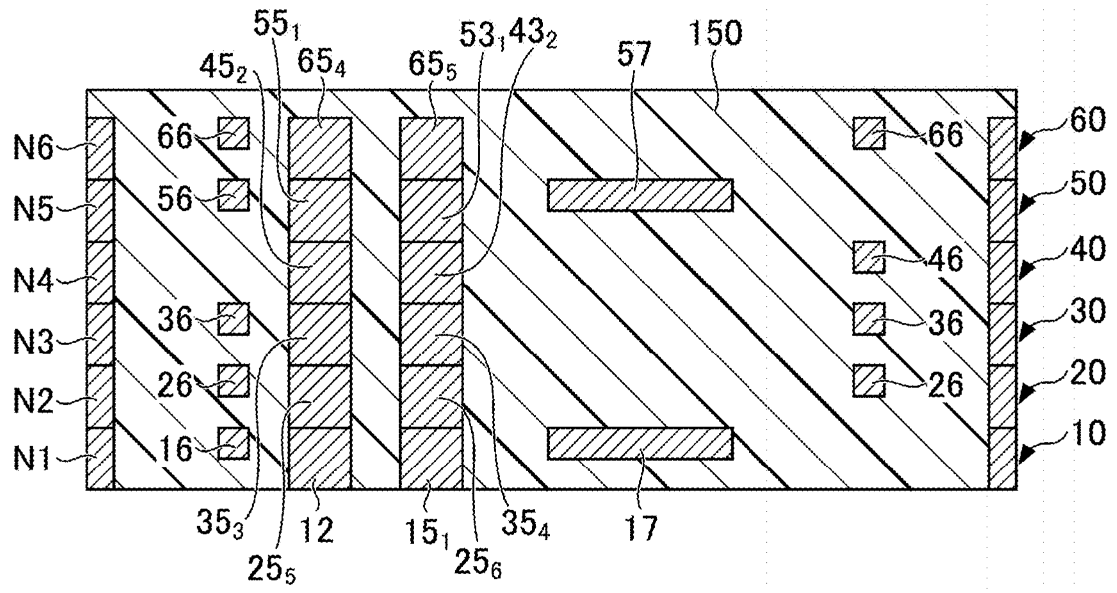
FIGS. 15A and 15B are diagrams illustrating steps of manufacturing an inductor according to the first embodiment.

In the step illustrated in FIG. 15A, an encapsulating resin 150 is formed on the coil structure 1 illustrated in FIG. 14B. For example, a thermosetting resin such as an epoxy resin, a polyimide resin, a phenolic resin, an acrylic resin, or a thermoplastic resin may be used as an insulating resin constituting the encapsulating resin 150. It should be noted that the encapsulating resin 150 is formed such that a portion of the end portion thick plate portion on one end side of the lead wire portions connected in series of the coil structure 1 and a portion of the end portion thick plate portion on the other end side of the lead wire portions connected in series are exposed.

That is, the encapsulating resin 150 is formed so as to expose the lower surface of the terminal portion 12, which is one end of the lead wire portions connected in series of the coil structure 1. Also, the encapsulating resin 150 is formed so as to expose the lower surface of the support portion 15$_4$, which is layered on the lower side of the terminal portion 62, which is the other end of the lead wire portions connected in series of the coil structure 1.

After the encapsulating resin 150 is formed, the lower surface of the encapsulating resin 150 is preferably subjected to a polishing or blast process to remove resin burrs on the lower surface of the terminal portion 12, the support portion 15$_4$, and the like. A low-pressure molding process, such as a transfer molding process or a compression molding process, for example, may be used to form the encapsulating resin 150.

Figure 15B:
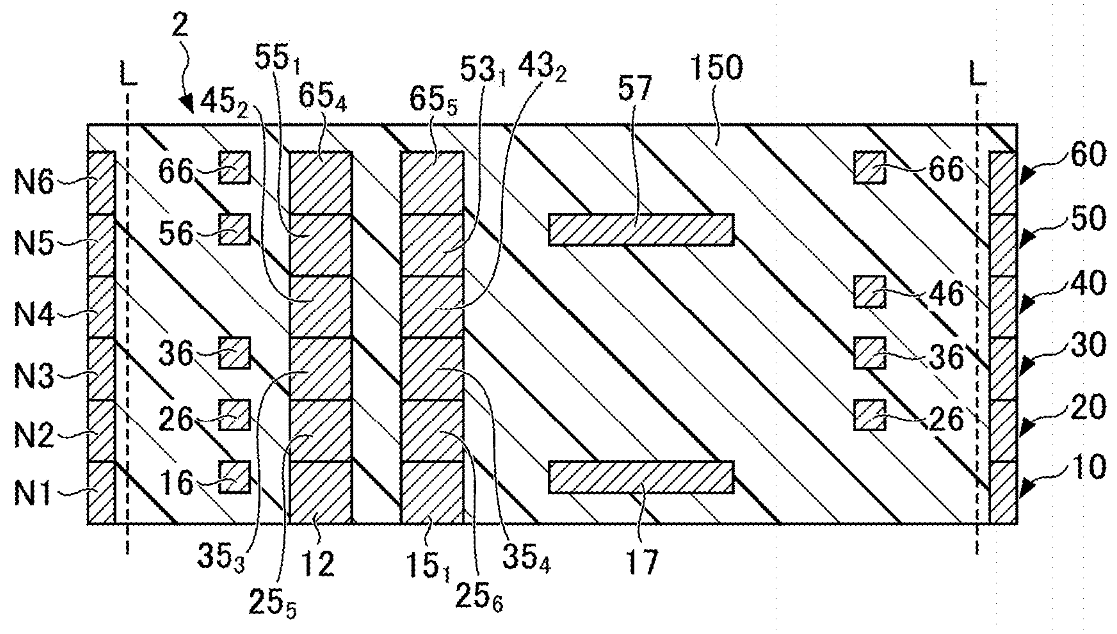
Figure 16A:
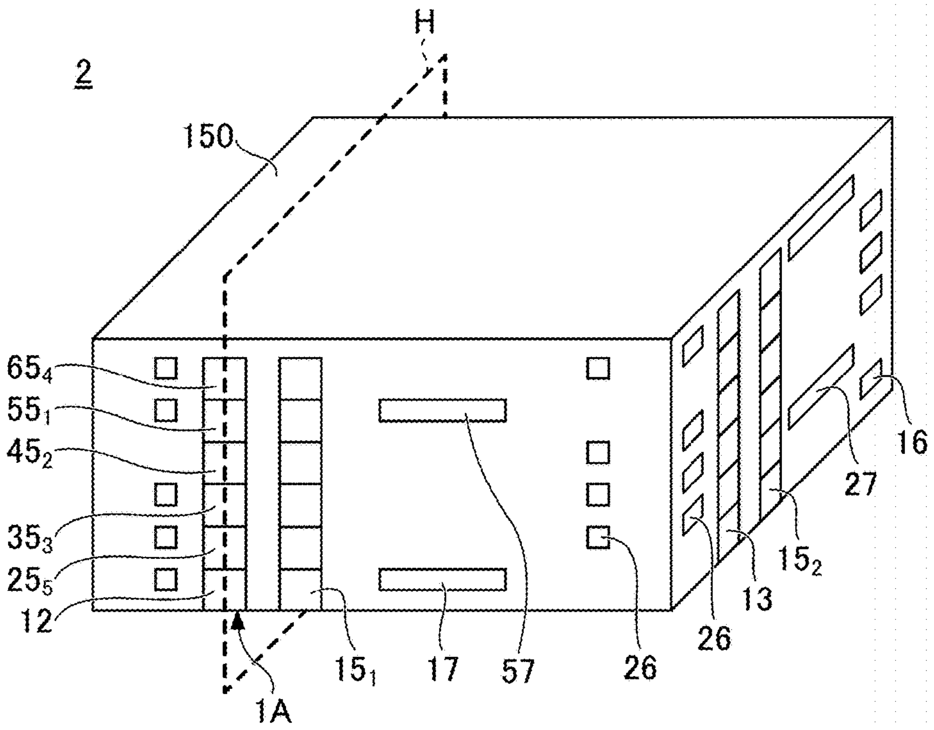
FIG. 16A and FIG. 16B are diagrams illustrating an example of an inductor according to the first embodiment.
Figure 16B:
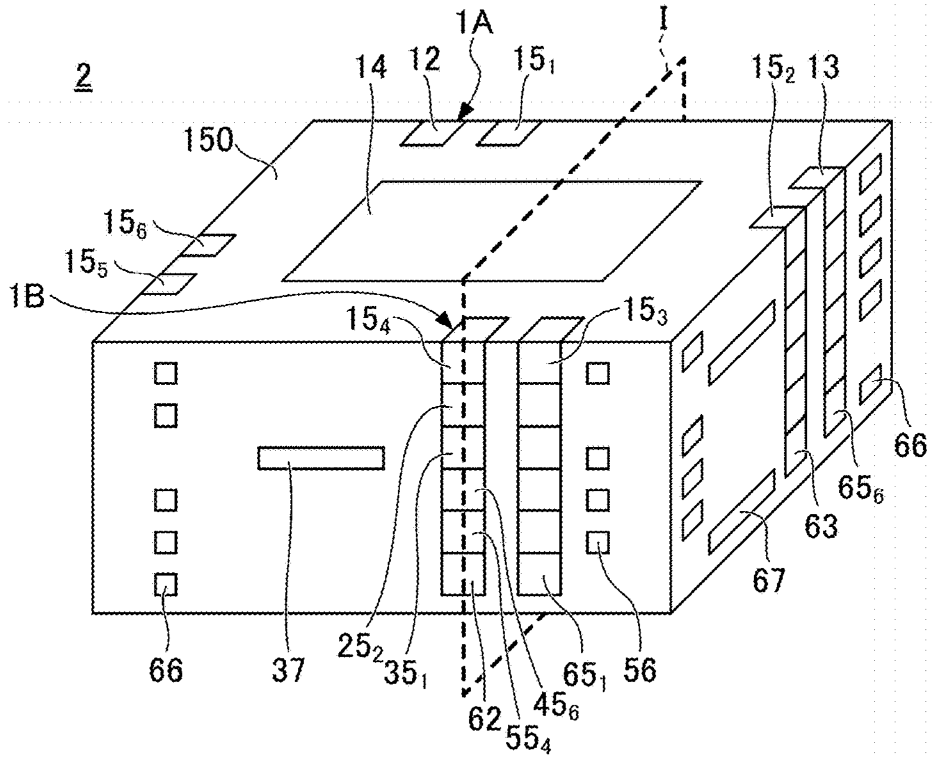

Next, in the step illustrated in FIG. 15B, the structure illustrated in FIG. 15A is cut using a dicing blade or the like at the positions of the cutting lines L to be separated to form inductors 2. The structure illustrated in FIG. 15A may be separated by pressing or etching. It should be noted that the cutting lines L indicate a position corresponding to the broken line representing the product area M in FIG. 1B. By the cutting, the side surfaces of the terminal portion 12, the support portion 25$_5$, the support portion 35$_3$, the support portion 45$_2$, the support portion 55$_1$, and the support portion 65$_4$, and the like are exposed from one side surface of the encapsulating resin 150. Also, the side surfaces of the support portion 15$_4$, the support portion 25$_2$, the support portion 35$_1$, the support portion 45$_6$, the support portion 55$_4$, the terminal portion 62, and the like are exposed from the other side surface of the encapsulating resin 150. From each of the product areas M, a surface mount inductor 2 illustrated in FIG. 16A and FIG. 16B is manufactured. For example, the plane shape of the inductor 2 may be a rectangular shape, such as a square shape or an oblong shape.

The side surface and the lower surface of the terminal portion 12, the side surface of the support portion 25$_5$, the side surface of the support portion 35$_3$, the side surface of the support portion 45$_2$, the side surface of the support portion 55$_1$, and the side surface of the support portion 65$_4$, which are exposed from the encapsulating resin 150 become an external connection terminal 1A. Also, the side surface and the lower surface of the support portion 15$_4$, the side surface of the support portion 25$_2$, the side surface of the support portion 35$_1$, the side surface of the support portion 45$_6$, the side surface of the support portion 55$_4$, and the side surface of the terminal 62, which are exposed from the encapsulating resin 150, become an external connection terminal 1B.

It should be noted that FIG. 16B is a diagram viewed from the lower surface side of FIG. 16A. In other words, FIG. 16B is a diagram obtained by rotating FIG. 16A by 180 degrees in the front-back direction on paper to be turned upside down. For example, the planar shape of the inductor 2 may be an approximately rectangular shape having a size of approximately 3 mm×3 mm. The thickness of the inductor 2 may be approximately 1.0 mm, for example.

Figure 17A:
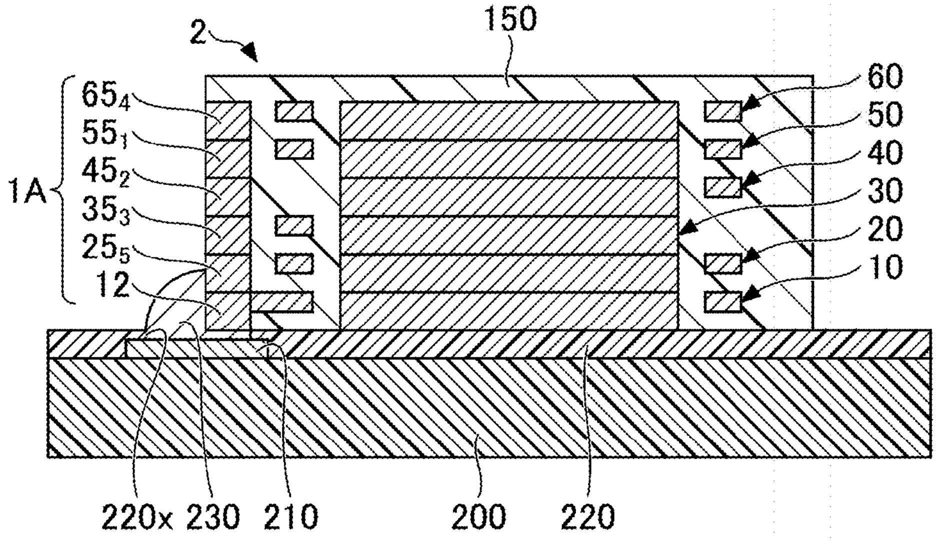
FIGS. 17A and 17B are cross-sectional views illustrating a method of mounting the inductor according to the first embodiment.
Figure 17B:
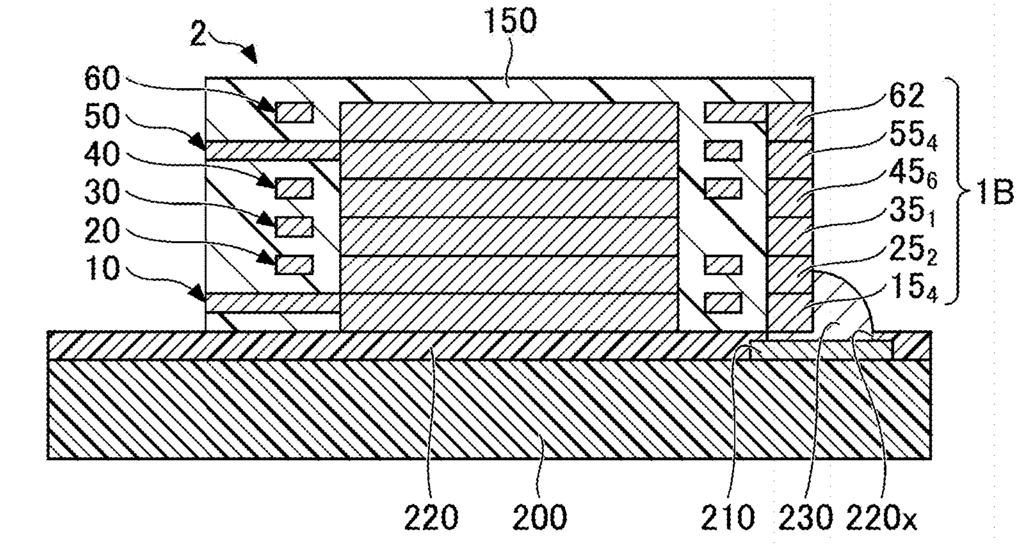

FIGS. 17A and 17B are cross-sectional views illustrating a method of mounting the inductor 2 according to the first embodiment. FIG. 17A illustrates the H cross-section of FIG. 16A, and FIG. 17B illustrates the I cross-section of FIG. 16B upside down. In FIG. 17A and FIG. 17B, the inductor 2 is mounted on a substrate 200. Specifically, a pad 210 is formed on one surface of the substrate 200 and a portion of the upper surface of the pad 210 is exposed in an opening portion 220*x* of a solder resist layer 220. The upper surface of the pad 210 exposed in the opening portion 220*x* is electrically connected by solder 230 to the external connection terminals 1A and 1B of the inductor 2.

As described above, in the coil structure 1, each metal plate is layered such that the magnetic core portions (inside thick plate portions) of the adjacent metal plates are bonded to each other to form a magnetic core C. By arranging the magnetic core C inside one helical coil, the magnetic flux can be increased and the induced electromotive force can be increased. That is, by encapsulating the coil structure 1 with the encapsulating resin 150 so as to expose the external connection terminals 1A and 1B, it is possible to realize a compact inductor 2 that enables to obtain a large induced electromotive force.

In the coil structure 1, the magnetic core connection portions are provided in areas, where the lead wire portions of the respective metal plates are not arranged, to support the magnetic core portions arranged inside the lead wire portions. By such a structure, it is possible to provide both a lead wire portion and a magnetic core portion on a single metal plate. Therefore, by layering each metal plate, it is possible to easily arrange, inside a single helical coil, a magnetic core C where the magnetic core portion of each metal plate is layered.

Also, in the coil structure 1, each of the metal plates includes a lead wire portion having a partial-loop shape, end portion thick plate portions that are formed at both ends of the lead wire portion and that are thicker than the lead wire portion, and an inside thick plate portion that is formed with a thickness the same as the end portion thick plate portions, the inside thick plate portion being arranged inside the partial loop formed by the lead wire portion and being away from the lead wire portion. Then, each of the metal plates is layered such that the adjacent metal plates are bonded to each other at one of the end portion thick plate portions and the lead wire portions of the respective metal plates are connected in series to form a single coil having a partial-loop shape. In such a structure, it is easy to increase the number of turns of the coil by increasing the number of layering metal plates. As a result, the induced electromotive force of the inductor 2 using the coil structure 1 can be further increased.

In the coil structure 1, on the lower side of each thick plate portion of one metal plate, any of the thick plate portions of another metal plate located at the lower layer is arranged. That is, a support portion included in one of two adjacent metal plates is bonded to an end portion thick plate portion or a support portion included in the other of the two adjacent metal plates. Therefore, the upper and lower metal plates can be easily bonded together.

For example, if a part, where a thick plate portion of another metal plate located at the lower layer is not arranged, is present at the lower side of each thick plate portion of one metal plate, when the metal plates are bonded to each other by applying heat and pressure from the upper and lower sides, a thick plate portion is generated that is in a floating state without being supported from the lower side. Therefore, bonding at that portion is difficult. On the other hand, in the coil structure 1, as described above, on the lower side of each thick plate portion of one metal plate, any of the thick plate portions of another metal plate located at the lower layer is necessarily arranged. Therefore, the respective metal plates can be easily bonded together by diffusion bonding or the like.

Also, in the coil structure 1, the end portion thick plate portion on one end side of the lead wire portions that are connected in series and the support portions of the other metal plates layered with the end portion thick plate portion on the one side form an external connection terminal on one side. Further, the end portion thick plate portion on the other end side of the lead wire portions that are connected in series and the support portions of the other metal plates layered with the end portion thick plate portion on the other side form an external connection terminal on the other side. Specifically, the five support portions layered on the upper side of the terminal portion of the metal plate as the lowermost layer form the external connection terminal 1A, and the five support portions layered on the lower side of the terminal portion of the metal plate as the uppermost layer form the external connection terminal 1B.

That is, on the upper side of the terminal portion 12, the support portions $\mathbf{25}_5$, $\mathbf{35}_3$, $\mathbf{45}_2$, $\mathbf{55}_1$, and $\mathbf{65}_4$ are layered in order from the bottom to constitute the external connection terminal 1A. Also, on the lower side of the terminal portion 62, the support portions $\mathbf{55}_4$, $\mathbf{45}_6$, $\mathbf{35}_1$, $\mathbf{25}_2$, and $\mathbf{15}_4$ are layered in order from top to constitute the external connection terminal 1B. Because the respective thick plate portions constituting the external connection terminal 1A are electrically connected to each other, connection with the outside can be performed by a desired layer of the external connection terminal 1A. Similarly, because the respective thick plate portions constituting the external connection terminal 1B are electrically connected to each other, connection with the outside can be performed by a desired layer of the external connection terminal 1B.

In the above description, for convenience, the lead wire portion 11 side is the start point and the lead wire portion 61 side is the end point. However, the coil structure 1 may be non-polar, and current may flow from the external connection terminal 1A to the external connection terminal 1B, or may flow from the external connection terminal 1B to the external connection terminal 1A.

It should be noted that the coil structure 1 may be shipped as a product or the inductor 2 may be shipped as a product. Also, any one or more of the first metal plate 10, the second metal plate 20, the third metal plate 30, the fourth metal plate 40, the fifth metal plate 50, and the sixth metal plate 60 before being layered may be shipped as a lead frame. That is, a lead frame may be shipped including a lead wire portion having a partial-loop shape; end portion thick plate portions that are formed at both ends of the lead wire portion and that are thicker than the lead wire portion; and an inside thick plate portion that is formed with a thickness the same as the end portion thick plate portions, the inside thick plate portion being arranged inside the partial loop formed by the lead wire portion, being away from the lead wire portion, and being a magnetic core.

First Modified Example of the First Embodiment

A first modified example of the first embodiment illustrates an example in which a lead wire portion, an end portion thick plate portion, and an inside thick plate portion to be a magnetic core portion of each metal plate are formed in the same pattern. It should be noted that, in the first modified example of the first embodiment, the description for the same constituent elements as those of the embodiment previously described may be omitted.

Figure 18A:
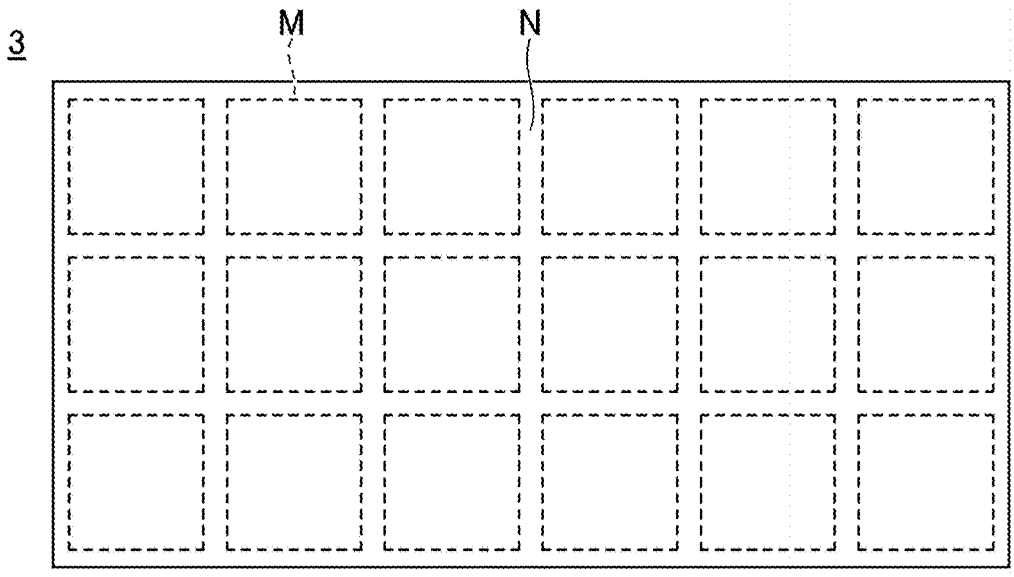
FIGS. 18A and 18B are plan views illustrating an example of a coil structure according to a first modified example of the first embodiment.
Figure 18B:
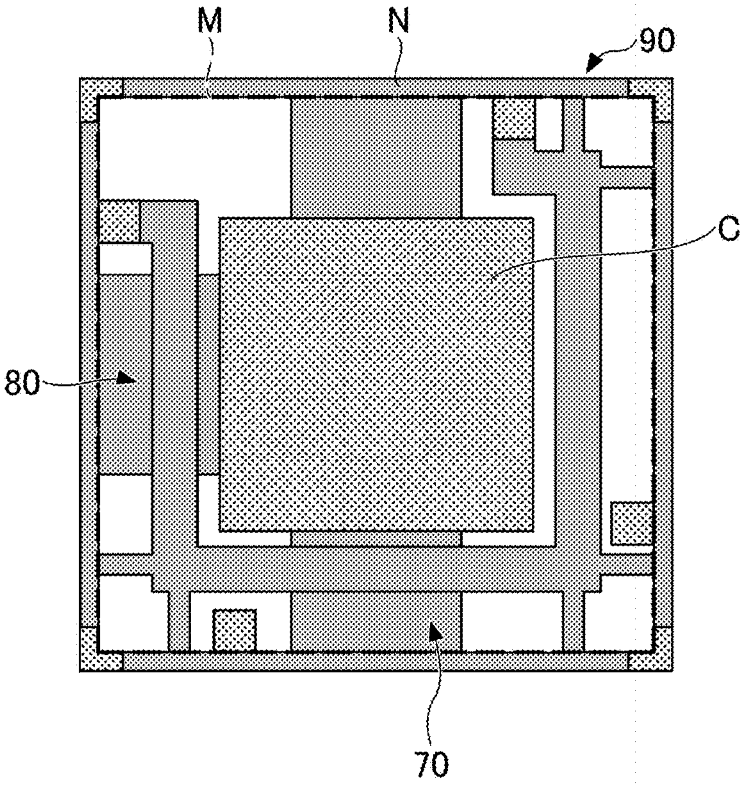

FIG. 18A and FIG. 18B are plan views illustrating an example of a coil structure 3 according to the first modified example of the first embodiment. FIG. 18A illustrates an overall view, and FIG. 18B illustrates an enlarged view of a vicinity of one product area in FIG. 18A.

The coil structure 3 illustrated in FIG. 18A and FIG. 18B has a structure in which three metal plates are layered, and vertically adjacent metal plates are bonded to each other. Although the coil structure 3 having a three-layer structure in which a first metal plate 70, a second metal plate 80, and a third metal plate 90 are successively layered is describe as an example in the present embodiment, the coil structure 3 may have a two-layer structure.

The coil structure 3 has a plurality of product areas M arranged vertically and horizontally in a checkerboard pattern in a plan view. Each of the product areas M becomes an inductor after the entire coil structure 3 is encapsulated by a resin and separated. A frame portion N having a picture-frame shape, which supports each of the product areas M from the peripheral side, is formed around each of the product areas M. Adjacent frame portions N are integrally formed and coupled to each other. In the present embodiment, the respective sides of each frame portion N are equal in length. It should be noted that although FIG. 18A illustrates an example in which 18 (3 rows by 6 columns) product areas M are arranged, the number of product areas M is not particularly limited to this.

Figure 19A:
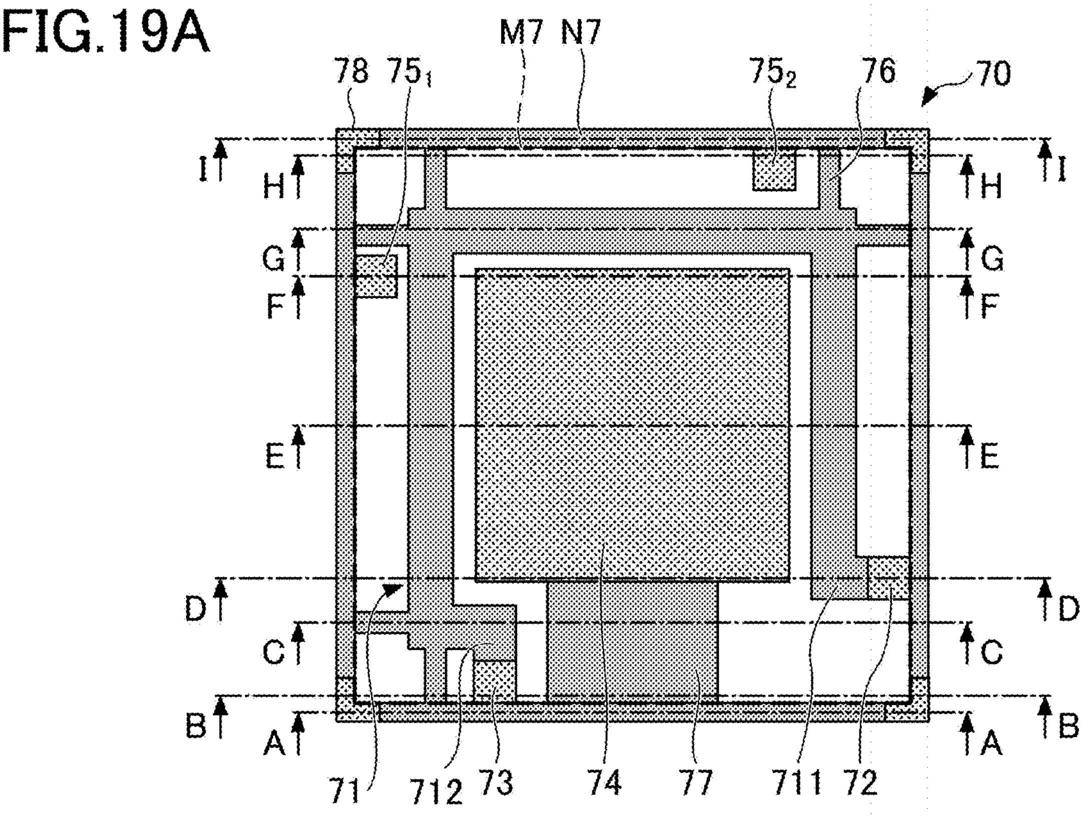
FIGS. 19A and 19B are plan views (part 1) illustrating an example of a vicinity of the product area of each metal plate before being layered.
Figure 19B:
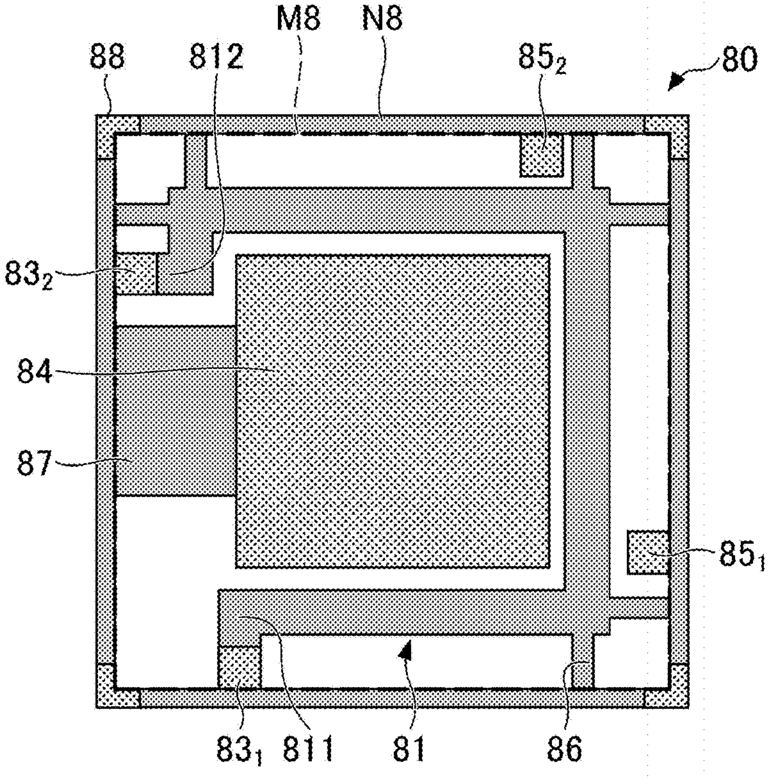
Figure 20:
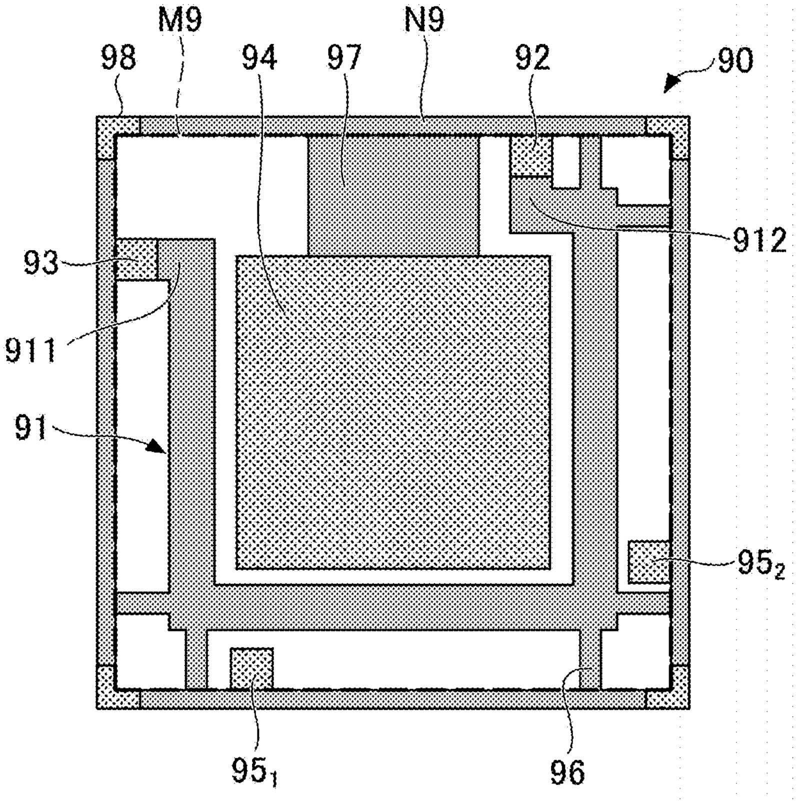
FIG. 20 is a plan views (part 2) illustrating the example of the vicinity of the product area of each metal plate before being layered.

FIG. 19A to FIG. 20 are plan views illustrating an example of the vicinity of the product area of each metal plate before being layered. Specifically, FIG. 19A is a plan view of the first metal plate 70, and FIG. 19B is a plan view of the second metal plate 80. FIG. 20 is a plan view of the third metal plate 90.

Each of the first metal plate 70, the second metal plate 80, and the third metal plate 90 has a planar shape similar to that of FIG. 18A. FIG. 19A to FIG. 20 illustrate an example of a portion (near one product area) of each metal plate corresponding to FIG. 18B. In FIG. 19A through FIG. 20, a portion indicated in grey illustrates a thin plate portion, and a portion indicated by a halftone dot pattern illustrates a thick plate portion that is formed to be thicker than the thin plate portion and protrude downward relative to the thin plate portion. The thin plate portion and the thick plate portion are integrally formed.

The product areas M illustrated in FIG. 19A to FIG. 20 include the product area M7 of the first metal plate 70, the product area M8 of the second metal plate 80, and the product area M9 of the third metal plate 90. Further, the frame portions N illustrated in FIG. 19A to FIG. 20 include a frame portion N7 of the first metal plate 70, a frame portion N8 of the second metal plate 80, and a frame portion N9 of the third metal plate 90.

Figure 21A:
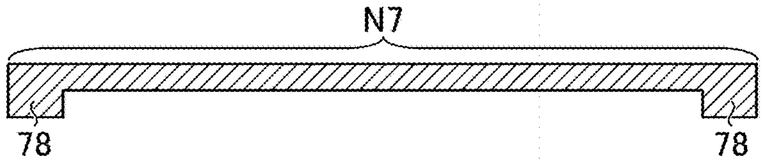
FIGS. 21A to 21I are cross sectional views of a first metal plate taken along lines A-A to I-I.
Figure 21B:
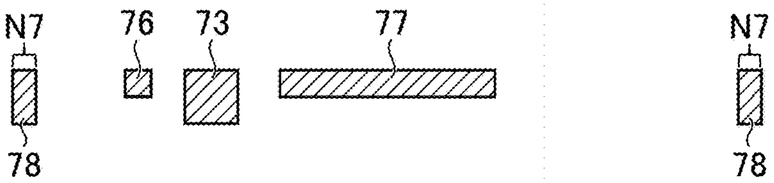
Figure 21C:
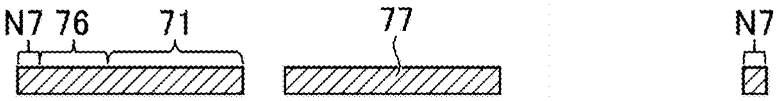
Figure 21D:
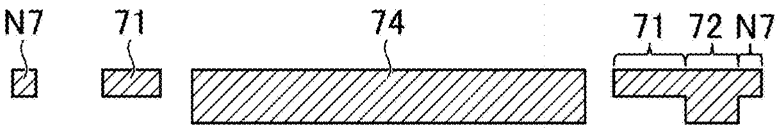
Figure 21E:
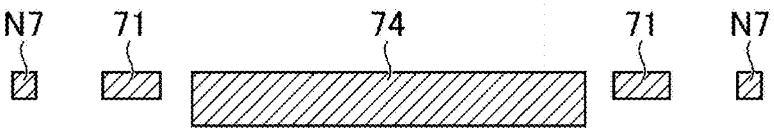
Figure 21F:
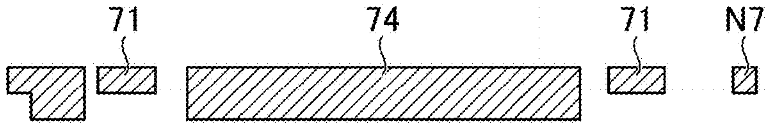
Figure 21G:
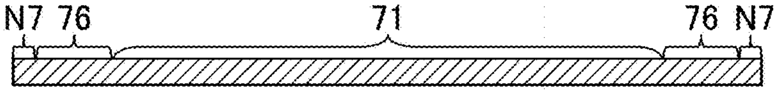
Figure 21H:
Figure 21I:
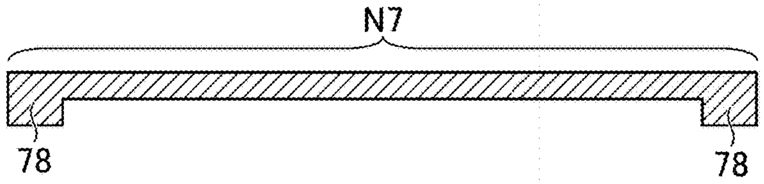

FIG. 21A to FIG. 21I are cross sectional views of the first metal plate 70 taken along lines A-A to I-I in FIG. 19A, respectively. Specifically, FIG. 21A is the cross sectional view of the first metal plate 70 taken along the line A-A in FIG. 19A. Specifically, FIG. 21B is the cross sectional view of the first metal plate 70 taken along the line B-B in FIG. 19A. Specifically, FIG. 21C is the cross sectional view of the first metal plate 70 taken along the line C-C in FIG. 19A. Specifically, FIG. 21D is the cross sectional view of the first metal plate 70 taken along the line D-D in FIG. 19A. Specifically, FIG. 21E is the cross sectional view of the first metal plate 70 taken along the line E-E in FIG. 19A. Specifically, FIG. 21F is the cross sectional view of the first metal plate 70 taken along the line F-F in FIG. 19A. Specifically, FIG. 21G is the cross sectional view of the first metal plate 70 taken along the line G-G in FIG. 19A. Specifically, FIG. 21H is the cross sectional view of the first metal plate 70 taken along the line H-H in FIG. 19A. Specifically, FIG. 21I is the cross sectional view of the first metal plate 70 taken along the line I-I in FIG. 19A.

As illustrated in FIG. 19A the product area M7 of the first metal plate 70 includes a lead wire portion 71, a terminal portion 72, a coupling portion 73, a magnetic core portion 74, and support portions $\mathbf{75}_1$ and $\mathbf{75}_2$.

The lead wire portion 71 is formed, inside the product area M7, in a partial-loop shape (approximately ¾ turns) that is substantially rectangular, and is connected to a frame portion N7 by a plurality of connection portions 76 extending from the inside of the product area M7 to the outside of the product area M7. Although the number and connection positions of the connection portions 76 may be determined as desired if the lead wire portion 71 can be stably supported with the frame portion N7, it is preferable that the connection portions are arranged near the corner portions of the lead wire portion 71 that has a substantially rectangular shape.

The terminal portion 72 is formed on a start point 711, which is one end of the lead wire portion 71, and the coupling portion 73 is formed on an end point 712, which is the other end of the terminal portion 71. The planar shapes of the terminal portion 72 and coupling portion 73 may be, for example, square shapes or oblong shapes. The lead wire portion 71, the connection portions 76, and the frame portion N7 are thin plate portions formed with a predetermined thickness, and the terminal portion 72 and the coupling portion 73 are thick plate portions formed with a same thickness thicker than the lead wire portion 71 and the like. The terminal portion 72 and the coupling portion 73 may be collectively referred to as end portion thick plate portions.

The terminal portion 72 is arranged inside the product area M7. The side of the terminal portion 72 opposite the connection portion with the start point 711 of the lead wire portion 71 extends to the outside of the product area M7 to be connected to the frame portion N7. The portion extending from the terminal portion 72 is a thin plate portion similar to the connection portions 76. The coupling portion 73 is arranged inside the product area M7. The side of the coupling portion 73 opposite the connection portion with the end point 712 of the lead wire portion 71 extends to the outside of the product area M7 to be connected to the frame portion N7. The portion extending from the coupling portion 73 is a thin plate portion similar to the connection portions 76. The side of the frame portion N7 to which the coupling portion 73 is connected is adjacent to and is substantially perpendicular to the side of the frame portion N7 to which the terminal portion 72 is connected.

The magnetic core portion 74 is arranged inside the partial loop formed by the lead wire portion 71 and is away from the lead wire portion 71. The magnetic core portion 74 is connected, by the magnetic core connection portion 77 extending from the inside of the product area M7 to the outside of the product area M7, to the side that is the same as the side of the frame portion N7 to which the coupling portion 73 is connected. That is, the magnetic core portion 74 is supported with the frame portion N7 through the magnetic core connection portion 77 provided in an area where the lead wire portion 71 of the first metal plate 70 is not arranged. The magnetic core portion 74 is a thick plate portion formed with the same thickness as the terminal portion 72 and the coupling portion 73 and is formed in a substantially square shape at a substantially central portion of the product area M7. The magnetic core connection portion 77 is a thin plate portion formed with the same thickness as the lead wire portion 71 and the like. The magnetic core portion 74 is electrically independent of the lead wire portion 71. The magnetic core portion 74 may be referred to as an inside thick plate portion.

The support portions $\mathbf{75}_1$ and $\mathbf{75}_2$ are arranged inside the product area M7 and each has one side extending to the outside of the product area M7 to be connected to the frame portion N7. The portion extending from each of the support portions $\mathbf{75}_1$ and $\mathbf{75}_2$ is a thin plate portion similar to the connection portions 76. The other side of each of the support portions $\mathbf{75}_1$ and $\mathbf{75}_2$ is not connected to the lead wire portion 71. That is, the support portions $\mathbf{75}_1$ and $\mathbf{75}_2$ and the lead wire portion 71 are not electrically connected. The support portions $\mathbf{75}_1$ and $\mathbf{75}_2$ are portions that support thick plate portions of other metal plates.

The support portion $75_1$ is connected to the side opposite to the side of the frame portion N7 to which the terminal portion 72 is connected. The support portion $75_2$ is connected to the side opposite to the side of the frame portion N7 to which the coupling portion 73 is connected.

The upper surfaces of the lead wire portion 71, the connection portions 76, the magnetic core connection portion 77, and the frame portion N7 (the surfaces toward the second metal plate 80) and the upper surfaces of the terminal portion 72, the coupling portion 73, the magnetic core portion 74, and the support portion $75_1$ and $75_2$ (the surfaces toward the second metal plate 80) are on a substantially same plane. On the other hand, the lower surfaces of the lead wire portion 71, the connection portions 76, the magnetic core connection portion 77, and the frame portion N7 are at positions recessed toward the second metal plate 80 relative to the lower surfaces of the terminal portion 72, the coupling portion 73, the magnetic core portion 74, and the support portion $75_1$ and $75_2$.

It should be noted that the frame portion N7 may have a first portion having the same thickness as the lead wire portion 71 and the like and a second portion having the same thickness as the terminal portion 72 and the like. For example, as the second portion, in order to reinforce the frame portion N7 and prevent the metal plate from being inclined, reinforcement portions 78 may be provided at the four corner portions of the frame portion N7. In this case, the lower surfaces of the reinforcement portions 78 are on a plane that is substantially the same as the lower surface of the terminal portion 72 and the like. The reinforcement portions 78 can be formed, for example, in an L-shape. In order to reinforce the frame portion N7 and prevent the metal plate from being inclined, in place of the reinforcement portions 78 or in addition to the reinforcement portions 78, a second portion (a thick plate portion) may be provided at a portion other than the corner portions of the frame portion N7.

The thicknesses of the terminal portion 72, the coupling portion 73, the magnetic core portion 74, and the support portions $75_1$ and $75_2$ may be, for example, about 50 μm to 500 μm. The thicknesses of the lead wire portion 71, the connection portions 76, the magnetic core connection portion 77, and the frame portion N7 may be, for example, about half that of the terminal portion 72 and the like. It should be noted that in a case in which a reinforcement portion 78 is provided on the frame portion N7, the thickness of the reinforcement portion 78 is the same as that of the terminal portion 72 and the like.

As illustrated in FIG. 19B, the product area M8 of the second metal plate 80 includes a lead wire portion 81, a coupling portion $83_1$, a coupling portion $83_2$, a magnetic core portion 84, and support portions $85_1$ and $85_2$. The coupling portion $83_1$ is formed on a start point 811, which is one end of the lead wire portion 81, and the coupling portion $83_2$ is formed on an end point 812, which is the other end of the lead wire portion 81.

The lead wire portion 81, the coupling portion $83_1$, the coupling portion $83_2$, the magnetic core portion 84, and the support portions $85_1$ and $85_2$ of the second metal plate 80 are formed in the same pattern as the lead wire portion 71, the terminal portion 72, the coupling portion 73, and the magnetic core portion 74, and the support portions $75_1$ and $75_2$ of the first metal plate 70. When the first metal plate 70 illustrated in FIG. 19A is rotated by 90 degrees clockwise, the first metal plate 70 overlaps with the second metal plate 80 illustrated in FIG. 19B in plan view. The thicknesses of the lead wire portion 81, the coupling portion $83_1$, the coupling portion $83_2$, the magnetic core portion 84, and the support portions $85_1$ and $85_2$ of the second metal plate 80 are also the same as the thicknesses of the lead wire portion 71, the terminal portion 72, the coupling portion 73, and the magnetic core portion 74, and the support portions $75_1$ and $75_2$ of the first metal plate 70.

As illustrated in FIG. 20, the product area M9 of the third metal plate 90 includes a lead wire portion 91, a terminal portion 92, a coupling portion 93, a magnetic core portion 94, and support portions $95_1$ and $95_2$. The coupling portion 93 is formed on a start point 911, which is one end of the lead wire portion 91, and the terminal portion 92 is formed on an end point 912, which is the other end of the terminal portion 91.

The lead wire portion 91, the terminal portion 92, the coupling portion 93, the magnetic core portion 94, and the support portions $95_1$ and $95_2$ of the third metal plate 90 are formed in the same pattern as the lead wire portion 71, the terminal portion 72, the coupling portion 73, and the magnetic core portion 74, and the support portions $75_1$ and $75_2$ of the first metal plate 70. When the first metal plate 70 illustrated in FIG. 19A is rotated by 180 degrees clockwise, the first metal plate 70 overlaps with the third metal plate 90 illustrated in FIG. 20 in plan view. The thicknesses of the lead wire portion 91, the terminal portion 92, the coupling portion 93, the magnetic core portion 94, and the support portions $95_1$ and $95_2$ of the third metal plate 90 are also the same as the thicknesses of the lead wire portion 71, the terminal portion 72, the coupling portion 73, and the magnetic core portion 74, and the support portions $75_1$ and $75_2$ of the first metal plate 70.

As described above, because the first metal plate 70, the second metal plate 80, and the third metal plate 90 are formed in the same pattern, each metal plate is layered while rotating by 90 degrees, and the coil structure 3 is formed.

Figure 22A:
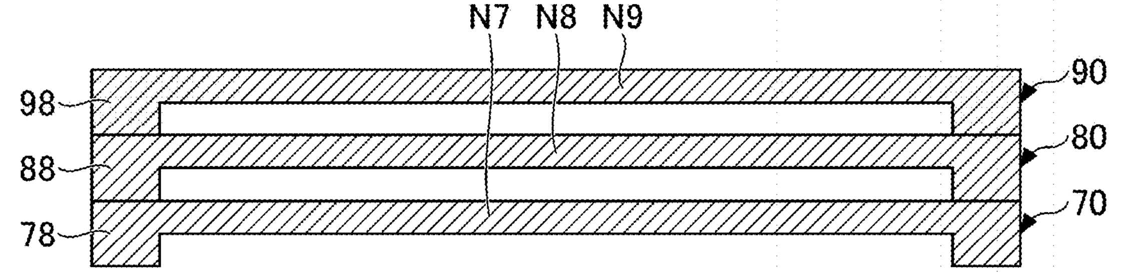
FIGS. 22A and 22B are cross sectional views of the coil structure taken along the lines A-A and B-B in FIG. 19A, respectively.
Figure 22B:
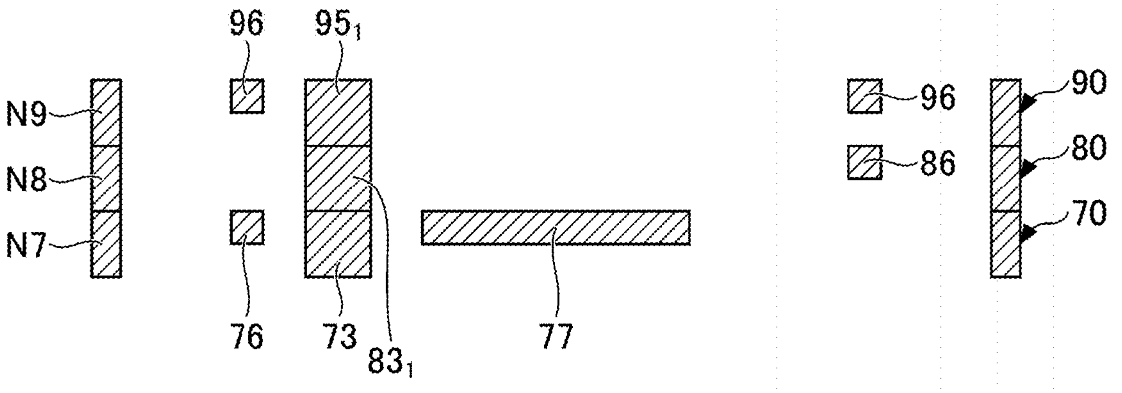
Figure 23A:
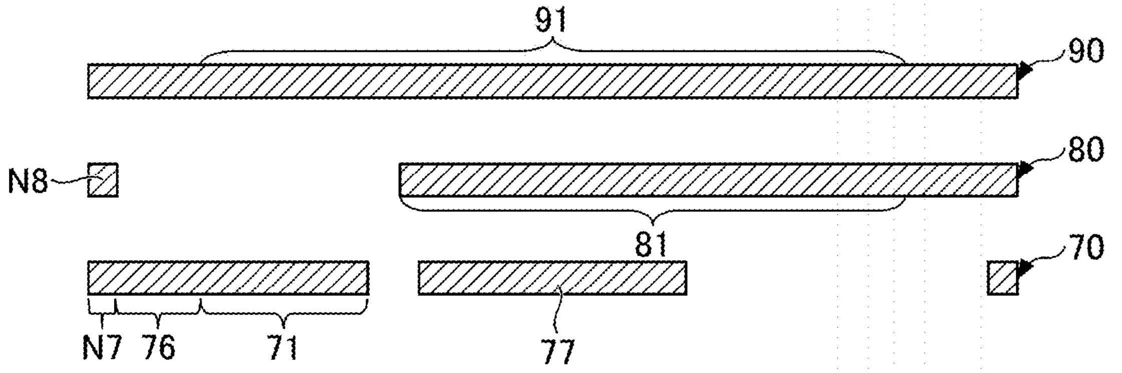
FIGS. 23A and 23B are cross sectional views of the coil structure taken along the lines C-C and D-D in FIG. 19A, respectively.
Figure 23B:
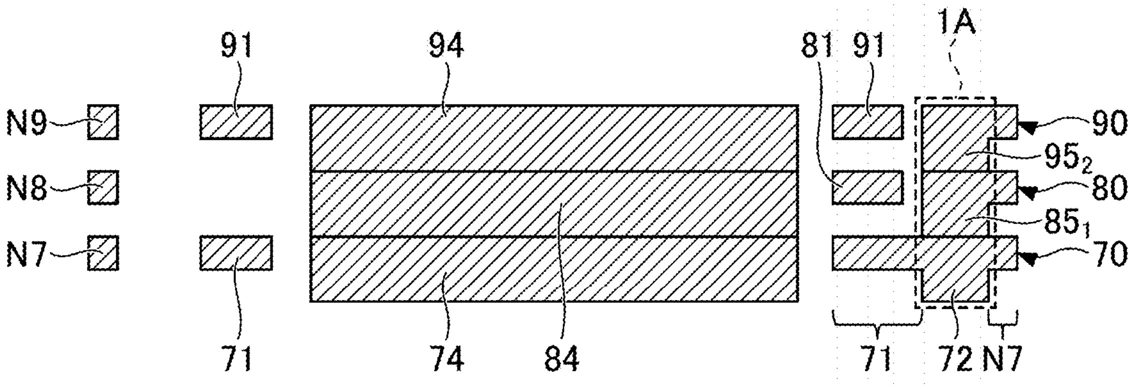
Figure 24A:
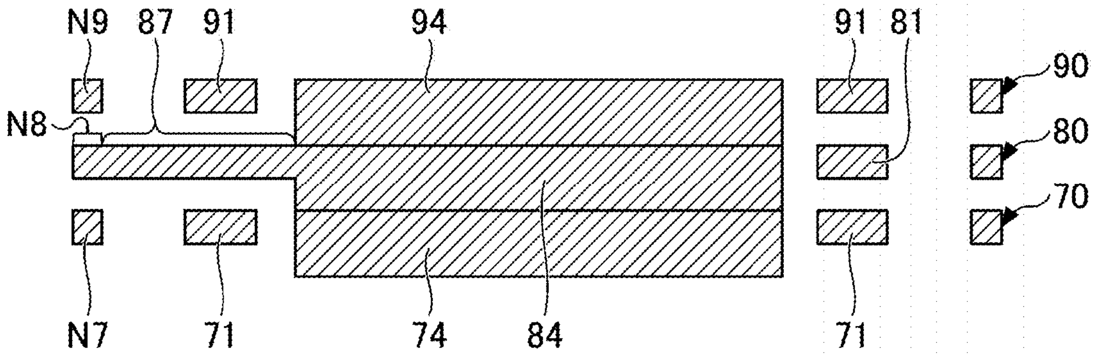
FIGS. 24A and 24B are cross sectional views of the coil structure taken along the lines E-E and F-F in FIG. 19A, respectively.
Figure 24B:
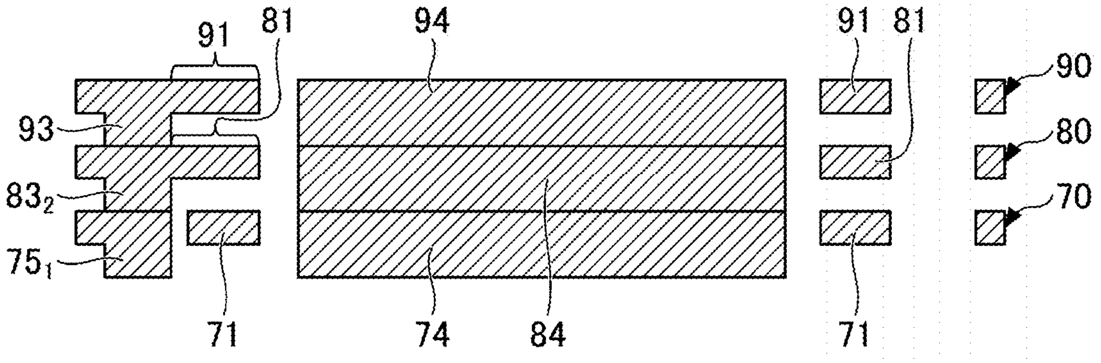
Figure 25A:
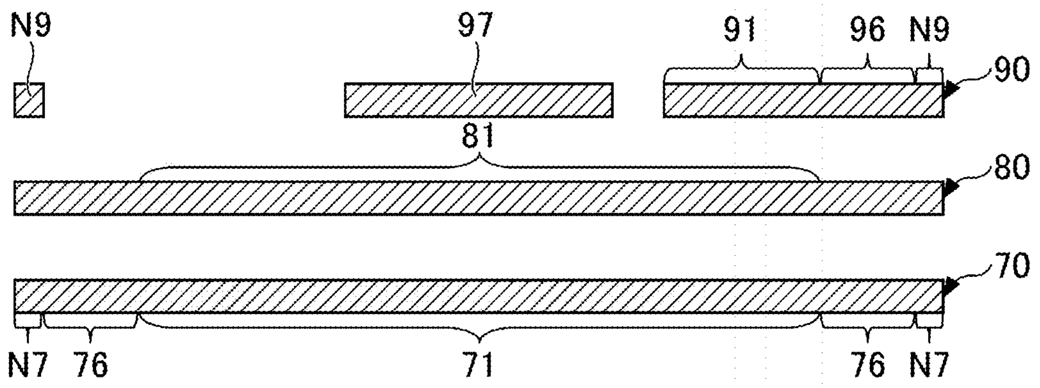
FIGS. 25A and 25B are cross sectional views of the coil structure taken along the lines G-G and H-H in FIG. 19A, respectively.
Figure 25B:
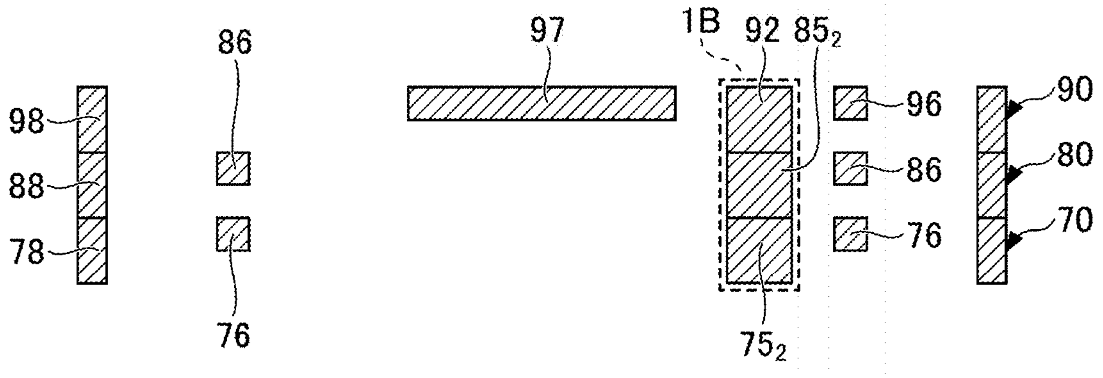
Figure 26:
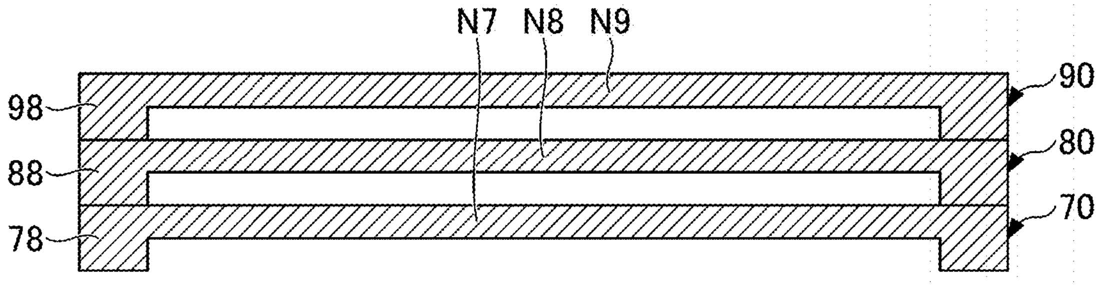
FIG. 26 is a cross sectional view of the coil structure taken along the line I-I in FIG. 19A.

FIGS. 22A and 22B are cross sectional views of the coil structure 3 taken along the lines A-A and B-B in FIG. 19A, respectively. FIGS. 23A and 23B are cross sectional views of the coil structure 3 taken along the lines C-C and D-D in FIG. 19A, respectively. FIGS. 24A and 24B are cross sectional views of the coil structure 3 taken along the lines E-E and F-F in FIG. 19A, respectively. FIGS. 25A and 25B are cross sectional views of the coil structure 3 taken along the lines G-G and H-H in FIG. 19A, respectively. FIG. 26 is a cross sectional view of the coil structure 3 taken along the line I-I in FIG. 19A. It should be noted that in FIG. 22A to FIG. 26, the illustration of some of the reference numerals are omitted for the sake of convenience.

Referring to FIG. 22A to FIG. 26 in addition to FIG. 18A to FIG. 21I, adjacent metal plates are bonded to each other in the coil structure 3. Adjacent metal plates can be bonded together, for example, by diffusion bonding.

Specifically, the second metal plate 80 is layered on the first metal plate 70, and the thick plate portions of both plates are bonded to each other. That is, the support portion $85_1$ is bonded on the terminal portion 72, the coupling portion $83_1$ is layered on the coupling portion 73, the coupling portion $83_2$ is layered on the support portion $75_1$, and the support portion $85_2$ is layered on the support portion $75_2$. The magnetic core portion 84 is also bonded on the magnetic core portion 74. Also, the respective reinforcement portions 88 are bonded on the respective reinforcement portions 78.

Thus, the coupling portion 73, which is connected to the end point 712 of the lead wire portion 71, and the coupling portion $83_1$, which is connected to the start point 811 of the lead wire portion 81, are electrically connected with each other, and the lead wire portion 71 and the lead wire portion 81 are connected in series. Also, because the lead wire portion 71 and the lead wire portion 81 are formed to be thinner than the terminal portion 72, the coupling portion $83_1$, and the like, the upper surface of the lead wire portion 71 and the lower surface of the lead wire portion 81 do not come into contact with each other. Also, because any of the thick plate portions of the first metal plate 70 is necessarily arranged on the lower side of each thick plate portion of the second metal plate 80, the upper and lower metal plates can be easily bonded together.

Similarly, the third metal plate 90 is layered on the second metal plate 80, and the thick plate portions of both plates are bonded to each other. That is, the support portion $95_1$ is bonded on the coupling portion $83_1$, the coupling portion 93 is layered on the coupling portion $83_2$, the support portion $95_2$ is layered on the support portion $85_1$, and the terminal portion 92 is layered on the support portion $85_2$. The magnetic core portion 94 is also bonded on the magnetic core portion 84. Also, the respective reinforcement portions 98 are bonded on the respective reinforcement portions 88.

Thus, the coupling portion $83_2$, which is connected to the end point 812 of the lead wire portion 81, and the coupling portion 93, which is connected to the start point 911 of the lead wire portion 91, are electrically connected with each other, and the lead wire portion 81 and the lead wire portion 91 are connected in series. Also, because the lead wire portion 81 and the lead wire portion 91 are formed to be thinner than the coupling portion $83_1$, the coupling portion 93, and the like, the upper surface of the lead wire portion 81 and the lower surface of the lead wire portion 91 do not come into contact with each other. Also, because any of the thick plate portions of the second metal plate 80 is necessarily arranged on the lower side of each thick plate portion of the third metal plate 90, the upper and lower metal plates can be easily bonded together.

According to the structure described above, in the coil structure 3, the end point 712 of the lead wire portion 71, the start point 811 of the lead wire portion 81, the end point 812 of the lead wire portion 81, and the start point 911 of the lead wire portion 91 are sequentially connected. Thereby, a single coil having a partial-loop shape is formed from the start point 711 of the lead wire portion 71 to the end point 912 of the lead wire portion 91. Also, in the coil structure 3, the magnetic core portions 74, 84, and 94 are sequentially layered and a magnetic core C is formed inside the single helical coil.

Figure 27A:
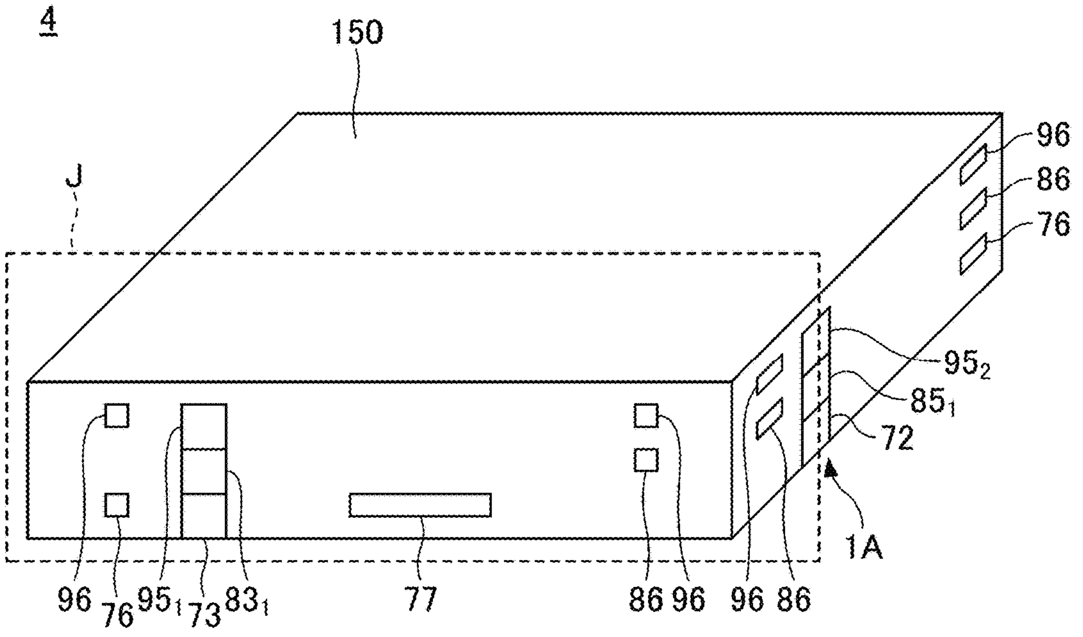
FIG. 27A and FIG. 27B are diagrams illustrating an example of an inductor according to a first modified example of the first embodiment.
Figure 27B:
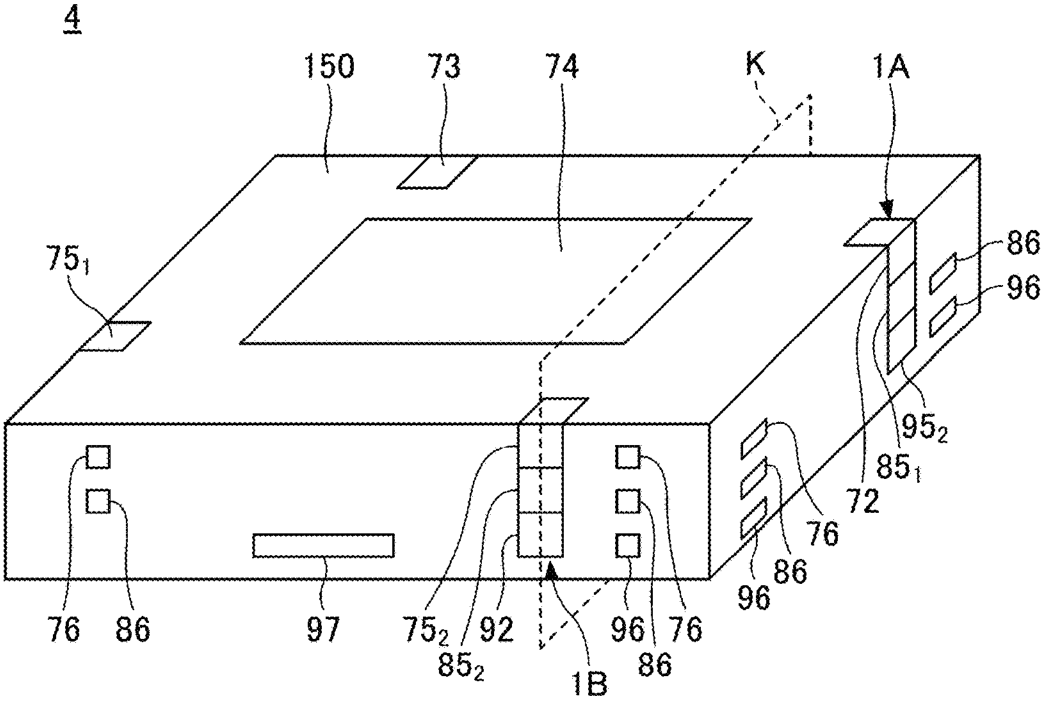

Similarly to the first embodiment, the surface mount inductor 4 illustrated in FIGS. 27A and 27B is manufactured by covering the coil structure 3 with the encapsulating resin 150 so that the portions to be external connection terminals are exposed. For example, the planar shape of the inductor 4 is a rectangular shape such as a square shape or an oblong shape.

The side surface and the lower surface of the terminal portion 72, the side surface of the support portion $85_1$, and the side surface of the support portion $95_2$ exposed from the encapsulating resin 150 are an external connection terminal 1A. Also, the side surface and the lower surface of the support portion $75_2$, the side surface of the support portion $85_2$, and the side surface of the terminal portion 92 exposed from the encapsulating resin 150 are an external connection terminal 1B.

It should be noted that FIG. 27B is a diagram viewed from the lower surface side of FIG. 27A. In other words, FIG. 27B is a diagram obtained by rotating FIG. 27A by 180 degrees in the front-back direction on paper to be turned upside down. For example, the planar shape of the inductor 4 may be an approximately rectangular shape having a size of approximately 3 mm×3 mm. The thickness of the inductor 4 may be approximately 1.0 mm, for example.

Figure 28A:
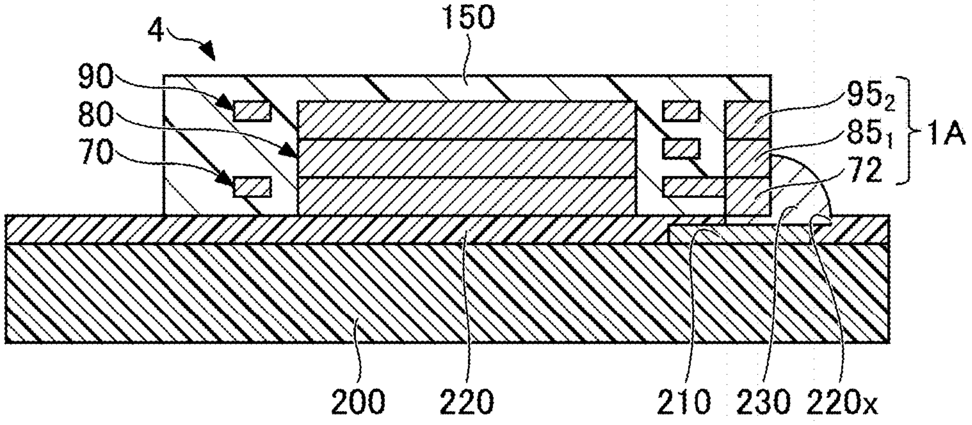
FIGS. 28A and 28B are cross-sectional views illustrating a method of mounting the inductor according to the first modified example of the first embodiment.
Figure 28B:
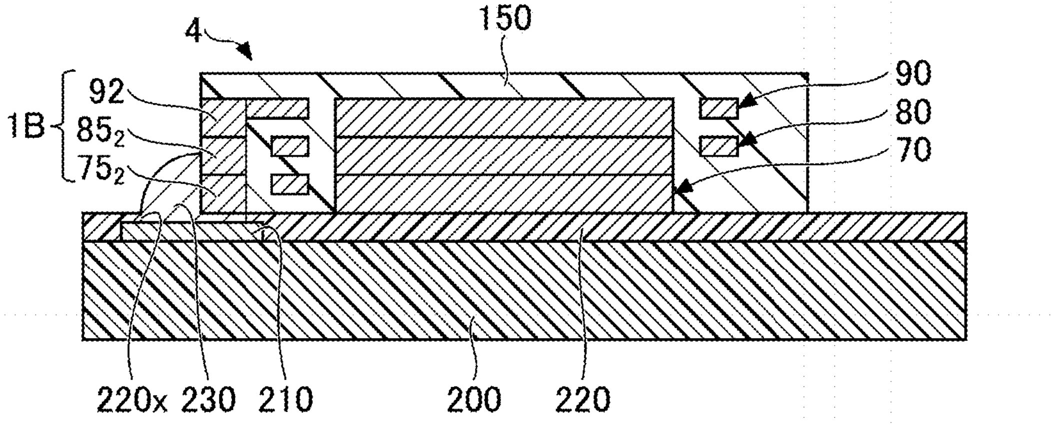

FIGS. 28A and 28B are cross-sectional views illustrating a method of mounting the inductor 4 according to the first modified example of the first embodiment. FIG. 28A illustrates the J cross-section of FIG. 27A, and FIG. 28B illustrates the K cross-section of FIG. 27B upside down. In FIG. 28A and FIG. 28B, the inductor 4 is mounted on a substrate 200. Specifically, a pad 210 is formed on one surface of the substrate 200 and a portion of the upper surface of the pad 210 is exposed in an opening portion 220*x* of a solder resist layer 220. The upper surface of the pad 210 exposed in the opening portion 220*x* is electrically connected by solder 230 to the external connection terminals 1A and 1B of the inductor 4.

As described above, in the coil structure 3, the lead wire portion, the end portion thick plate portion, and the inside thick plate portion to be a magnetic core portion of each of the metal plates are formed in the same pattern and each of the metal plates is layered while rotating by 90 degrees. By such a structure, it is possible to easily form a coil structure with two layers or three layers. Other effects can be obtained similarly to the first embodiment.

Although preferable embodiments have been described above in detail, the present disclosure is not limited to the embodiments described above, and various modifications and substitutions may be made for the embodiments described above without departing from the scope of claims.

For example, the planar shapes of the lead wire portions and the frame portions of the respective metal plates are not limited to substantially rectangular shapes, but may be a circular shape, an elliptical shape, or other more complex shapes.

Various aspects of the subject-matter described herein may be set out non-exhaustively in the following clause:

A method of manufacturing a coil structure including a plurality of layered metal plates, the method comprising:

- a step of patterning a plate-shaped metal to form the plurality of metal plates each of which includes a lead wire portion having a partial-loop shape, end portion thick plate portions that are formed at both ends of the lead wire portion and that are thicker than the lead wire portion, and an inside thick plate portion that is formed with a thickness the same as the end portion thick plate portions, the inside thick plate portion being arranged inside a partial loop formed by the lead wire portion and being away from the lead wire portion;
- a step of layering each of the metal plates; and
- wherein in the step of layering, adjacent metal plates are bonded to each other at one of the end portion thick plate portions, the lead wire portions of the respective metal plates are connected in series to form a coil having a partial-loop shape, and the inside thick plate portions of the adjacent metal plates are bonded to each other to form a magnetic core.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A coil structure comprising:
a plurality of layered metal plates,
wherein each of the metal plates includes a lead wire portion having a partial-loop shape, end portion thick plate portions that are formed at both ends of the lead wire portion and that are thicker than the lead wire portion, and an inside thick plate portion that is formed with a thickness the same as the end portion thick plate portions, the inside thick plate portion being arranged inside the partial-loop shape formed by the lead wire portion and being away from the lead wire portion, and
wherein each of the metal plates is layered such that adjacent metal plates are bonded to each other at one of the end portion thick plate portions, the lead wire portions of the respective metal plates are connected in series to form a coil having a helical shape, and the inside thick plate portions of the adjacent metal plates are bonded to each other to form a magnetic core.

2. The coil structure according to claim 1,
wherein each of the metal plates includes a support portion that is formed with a thickness the same as the end portion thick plate portions and that is arranged outside the partial loop formed by the lead wire portion,
wherein the support portion is electrically independent of the lead wire portion, and
wherein the support portion included in one of adjacent metal plates is bonded to the end portion thick plate portion or the support portion included in the other of the adjacent metal plates.

3. The coil structure according to claim 2, wherein external connection terminals are formed by
the end portion thick plate portion on one end side of the lead wire portions that are connected in series and the support portions of other metal plates layered with the end portion thick plate portion on the one side, and
the end portion thick plate portion on the other end side of the lead wire portions that are connected in series and the support portions of other metal plates layered with the end portion thick plate portion on the other side.

4. The coil structure according to claim 1, comprising:
a plurality of product areas to be inductors upon being separated; and
a frame portion that supports each of the plurality of product areas from a peripheral side,
wherein the lead wire portion, the end portion thick plate portions, and the inside thick plate portion are formed in each of the product areas.

5. The coil structure according to claim 4, wherein the inside thick plate portion is supported with the frame portion via a connection portion that is formed with a thickness the same as the lead wire portion.

6. The coil structure according to claim 4,
wherein the frame portion is formed in a picture frame shape of which respective sides are equal in length, and
wherein the lead wire portion, the end portion thick plate portions, and the inside thick plate portion of each of the metal plates are formed in a same pattern and each of the metal plates is layered while rotating by 90 degrees.

7. The coil structure according to claim 4, wherein the frame portion includes a first portion having a thickness the same as the lead wire portion, and a second portion having a thickness the same as the end portion thick plate portions and the inside thick plate portion.

8. An inductor comprising:
the coil structure according to claim 1; and
an encapsulating resin that covers the coil structure so that a portion of the end portion thick plate portion on one end side of the lead wire portions that are connected in series and a portion of the end portion thick plate portion on the other end side of the lead wire portions that are connected in series are exposed.

9. A lead frame comprising:
a lead wire portion having a partial-loop shape;
end portion thick plate portions that are formed at both ends of the lead wire portion and that are thicker than the lead wire portion;
an inside thick plate portion that is formed with a thickness the same as the end portion thick plate portions, the inside thick plate portion being arranged inside the partial-loop shape formed by the lead wire portion, being away from the lead wire portion, and being a magnetic core; and
a frame portion directly or indirectly connected to the lead wire portion, the end portion thick plate portions, and the inside thick plate portion,
wherein the inside thick plate portion is connected to the frame portion through a magnetic core connection portion having a same thickness as the lead wire portion.

* * * * *